US011888858B2

(12) United States Patent
Smith et al.

(10) Patent No.: US 11,888,858 B2
(45) Date of Patent: Jan. 30, 2024

(54) CALCULUS FOR TRUST IN EDGE COMPUTING AND NAMED FUNCTION NETWORKS

(71) Applicant: Intel Corporation, Santa Clara, CA (US)

(72) Inventors: Ned M. Smith, Beaverton, OR (US); Sunil Cheruvu, Tempe, AZ (US); Francesc Guim Bernat, Barcelona (ES); Kshitij Arun Doshi, Tempe, AZ (US); Eve M. Schooler, Portola Valley, CA (US); Dario Sabella, Munich (DE)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 17/064,218

(22) Filed: Oct. 6, 2020

(65) Prior Publication Data
US 2021/0021609 A1 Jan. 21, 2021

Related U.S. Application Data

(60) Provisional application No. 63/011,749, filed on Apr. 17, 2020.

(51) Int. Cl.
*H04L 29/06* (2006.01)
*H04L 9/40* (2022.01)
(Continued)

(52) U.S. Cl.
CPC ............ *H04L 63/123* (2013.01); *G06F 8/60* (2013.01); *H04L 45/72* (2013.01); *H04L 63/08* (2013.01); *H04L 67/568* (2022.05)

(58) Field of Classification Search
None
See application file for complete search history.

(56) References Cited

U.S. PATENT DOCUMENTS

2013/0298244 A1* 11/2013 Kumar ................. G06F 21/51
726/25
2019/0229919 A1* 7/2019 Gurkan ............... H04L 9/3218
2021/0218562 A1* 7/2021 Grobelny .............. G06F 21/52

OTHER PUBLICATIONS

"Etsi GS MEC 026 V2.1.1", Multi-access Edge Computing (MEC); Support for regulatory requirements, (Jan. 2019), 18 pgs.
(Continued)

*Primary Examiner* — Andrew J Steinle
(74) *Attorney, Agent, or Firm* — Schwegman Lundberg & Woessner, P.A.

(57) ABSTRACT

Various aspects of methods, systems, and use cases for verification and attestation of operations in an edge computing environment are described, based on use of a trust calculus and established definitions of trustworthiness properties. In an example, an edge computing verification node is configured to: obtain a trust representation, corresponding to an edge computing feature, that is defined with a trust calculus and provided in a data definition language; receive, from an edge computing node, compute results and attestation evidence from the edge computing feature; attempt validation of the attestation evidence based on attestation properties defined by the trust representation; and communicate an indication of trustworthiness for the compute results, based on the validation of the attestation evidence. In further examples, the trust representation and validation is used in a named function network (NFN), for dynamic composition and execution of a function.

25 Claims, 17 Drawing Sheets

(51) Int. Cl.
  *G06F 8/60* (2018.01)
  *H04L 45/00* (2022.01)
  *H04L 67/568* (2022.01)

(56) References Cited

OTHER PUBLICATIONS

Abadi, Martin, "A Calculus for Access Control in Distributed Systems", ACM Transactions on Programming Languages and Systems, vol. 15, No. 3,, (Sep. 1993), 29 pgs.

Birkholz, H, "Concise Data Definition Language (CDDL): A Notational Convention to Express Concise Binary Object Representation (CBOR) and JSON Data Structures", Internet Engineering Task Force (IETF), (Jun. 2019), 64 pgs.

Tschundin, Christian, "Named functions and cached computations", . In IEEE Consumer Communications and Networking Conference, (2014), 7 pgs.

* cited by examiner

# CALCULUS FOR TRUST IN EDGE COMPUTING AND NAMED FUNCTION NETWORKS

PRIORITY CLAIM

This application claims the benefit of priority to U.S. Provisional Patent Application Ser. No. 63/011,749, filed Apr. 17, 2020 and titled "FUNCTION GENERATION IN NAMED FUNCTION NETWORKS" which is incorporated herein by reference in its entirety.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

Within edge computing settings, there is expected to be a significant concern regarding security, privacy, trust, and trust relationships, especially as multiple entities (service providers, tenants, network operators, end users) all interact with each other on the same computing systems to provide and use edge computing services. In this context, improvements are needed to implement and validate trust properties from among a variety of actors.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following embodiments generally relate to the definition, communication, verification, and implementation of trust properties in a distributed edge computing environment. In specific examples, a trust calculus is extended for a variety of Edge/Mobile Edge computing settings, to describe and communicate trust and transitive trust relationships that occur in the context of services, functions, applications, and other features of orchestrated multi-tenant isolated environments.

In an example, a common trust level agreement (TLA) may be established between participants to include trust expressions using the presently described calculus (hereinafter, a "trust calculus"). Security controllers, orchestrators, and other nodes may use the presently described trust calculus and these expressions to analyze trust exposure, compute overlapping trust semantics, and apply an enforcement, logging or other response to trust computations based on the calculus. The present trust calculus may also be extended (with intersection, subtraction and variables) for use in various service use cases, such as those involved in MEC or distributed edge service use cases. A representation of the calculus using popular data definition languages such as JSON, JWT, and CWT is also described, and may be used as part of machine automation that parses, interprets, and protects with integrity and confidentiality.

Also in an example, the presently described trust calculus is extended for the use in named function network (NFN) and other applications of named data network (NDN) or more broadly other information centric network (ICN) settings. In such networking settings, the trust calculus may be applied for attestation operations to improve the trustworthiness of functions and data, including dynamically constructed functions, within an NFN environment.

Figure 1:
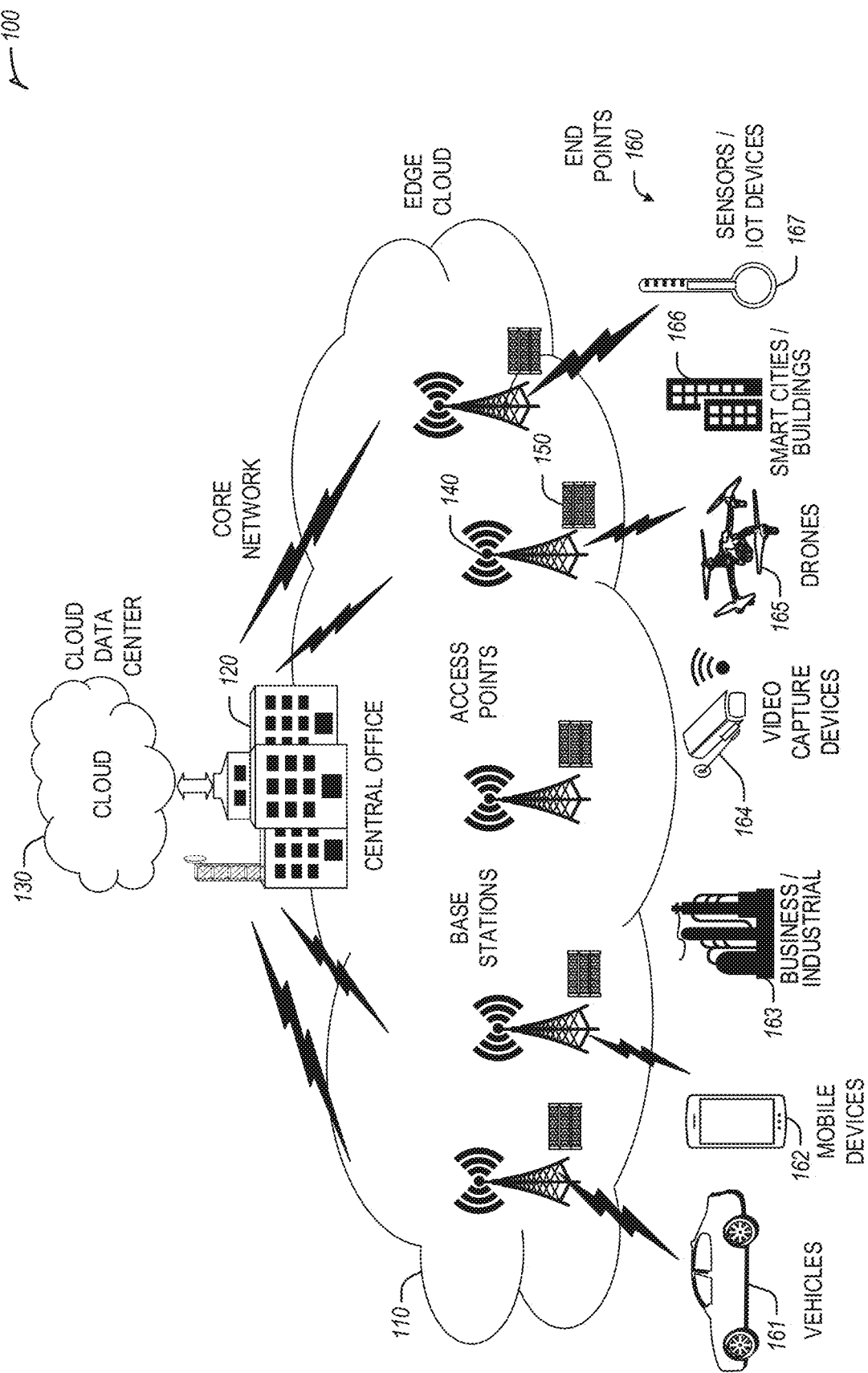
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
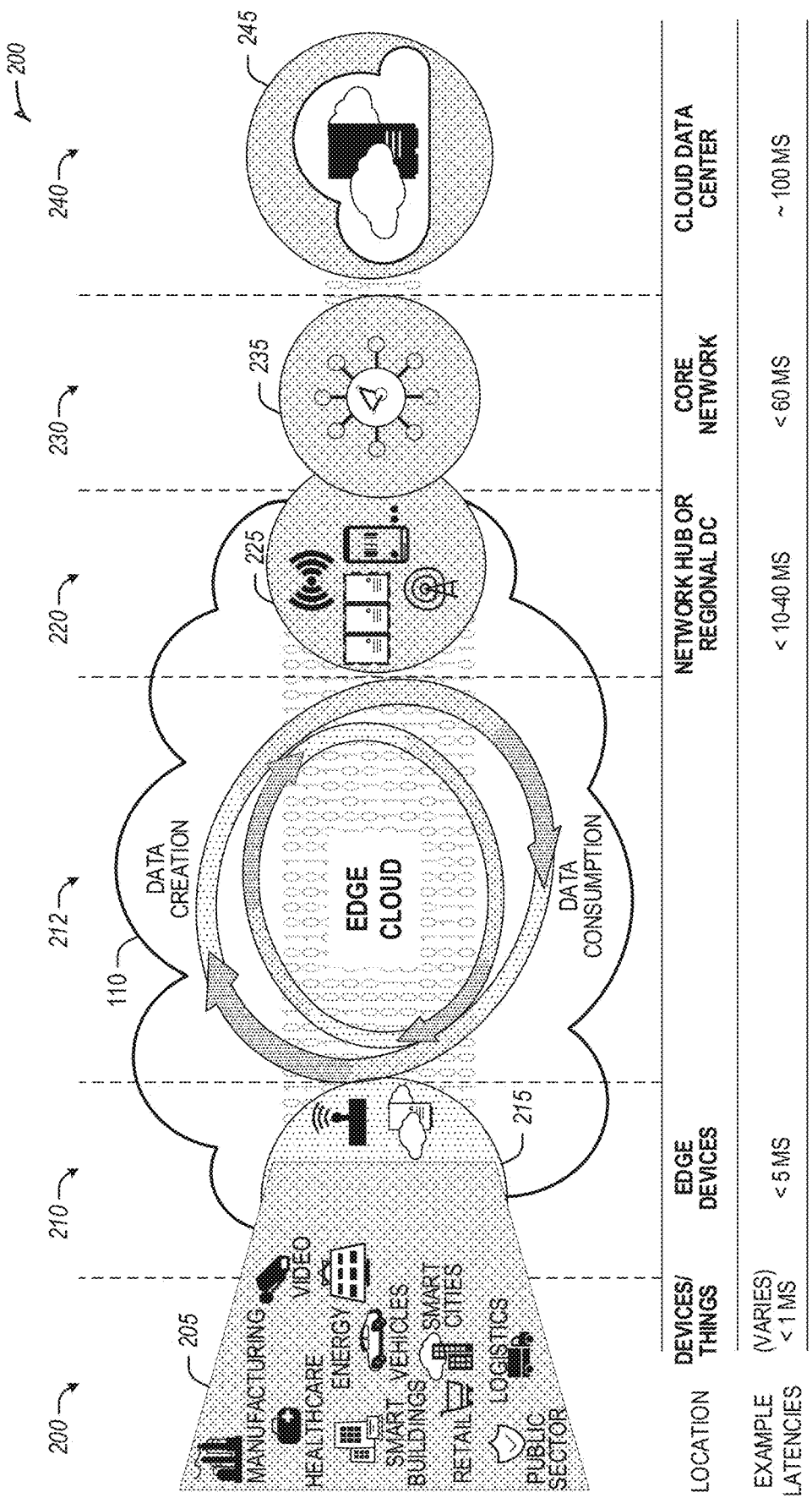
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
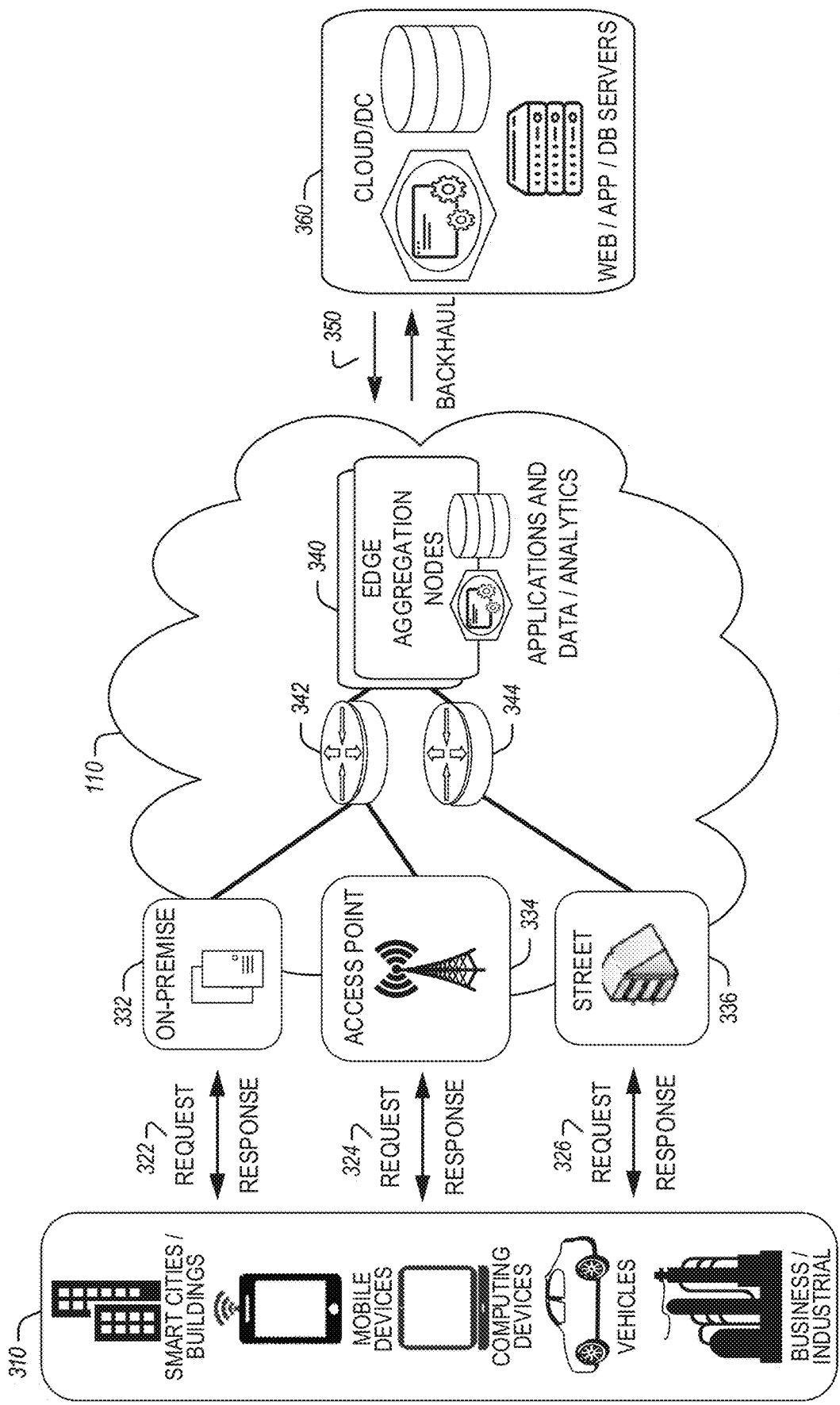
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
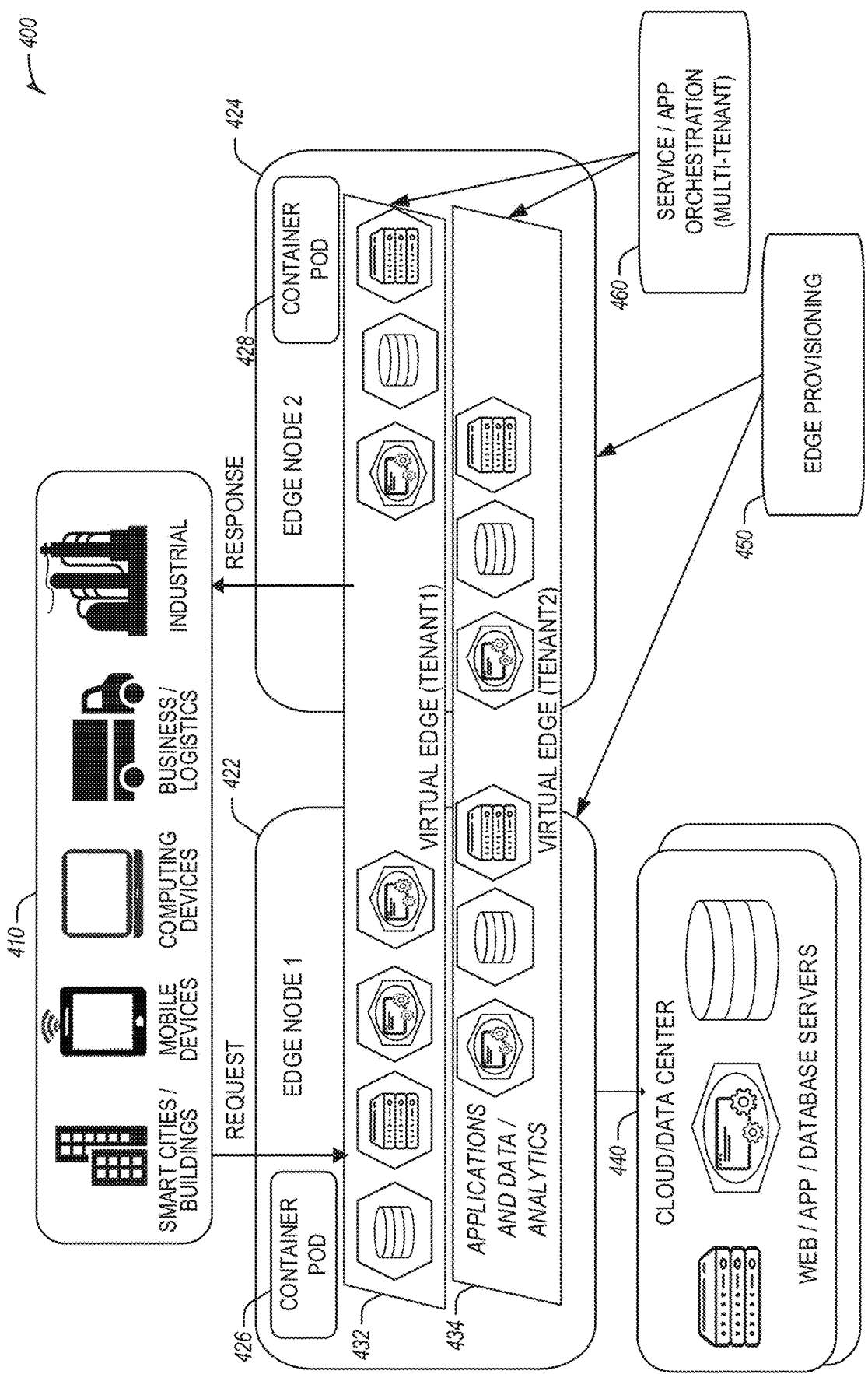
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant 1 'slice' while a Tenant 2 may function within a tenant 2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
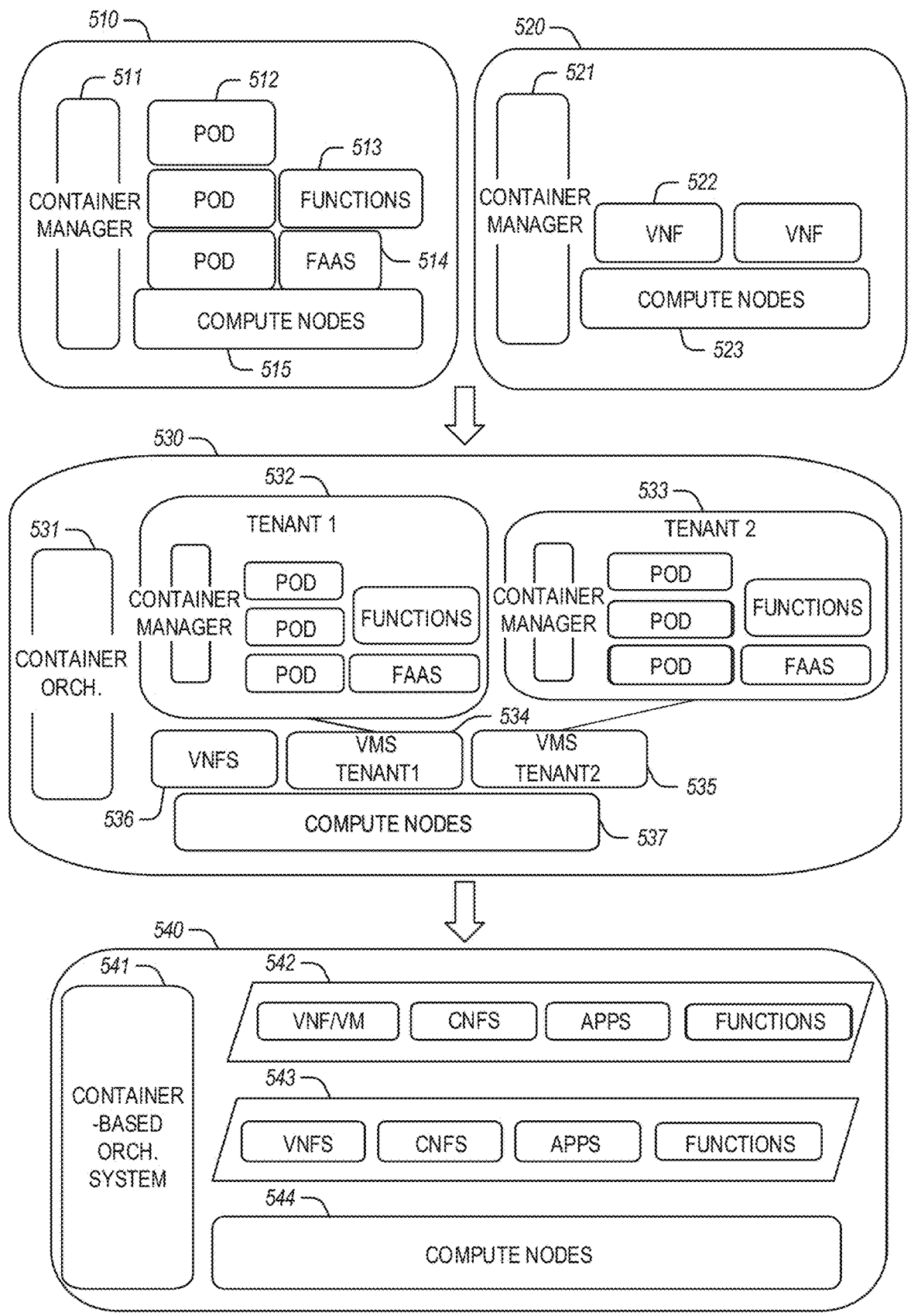
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
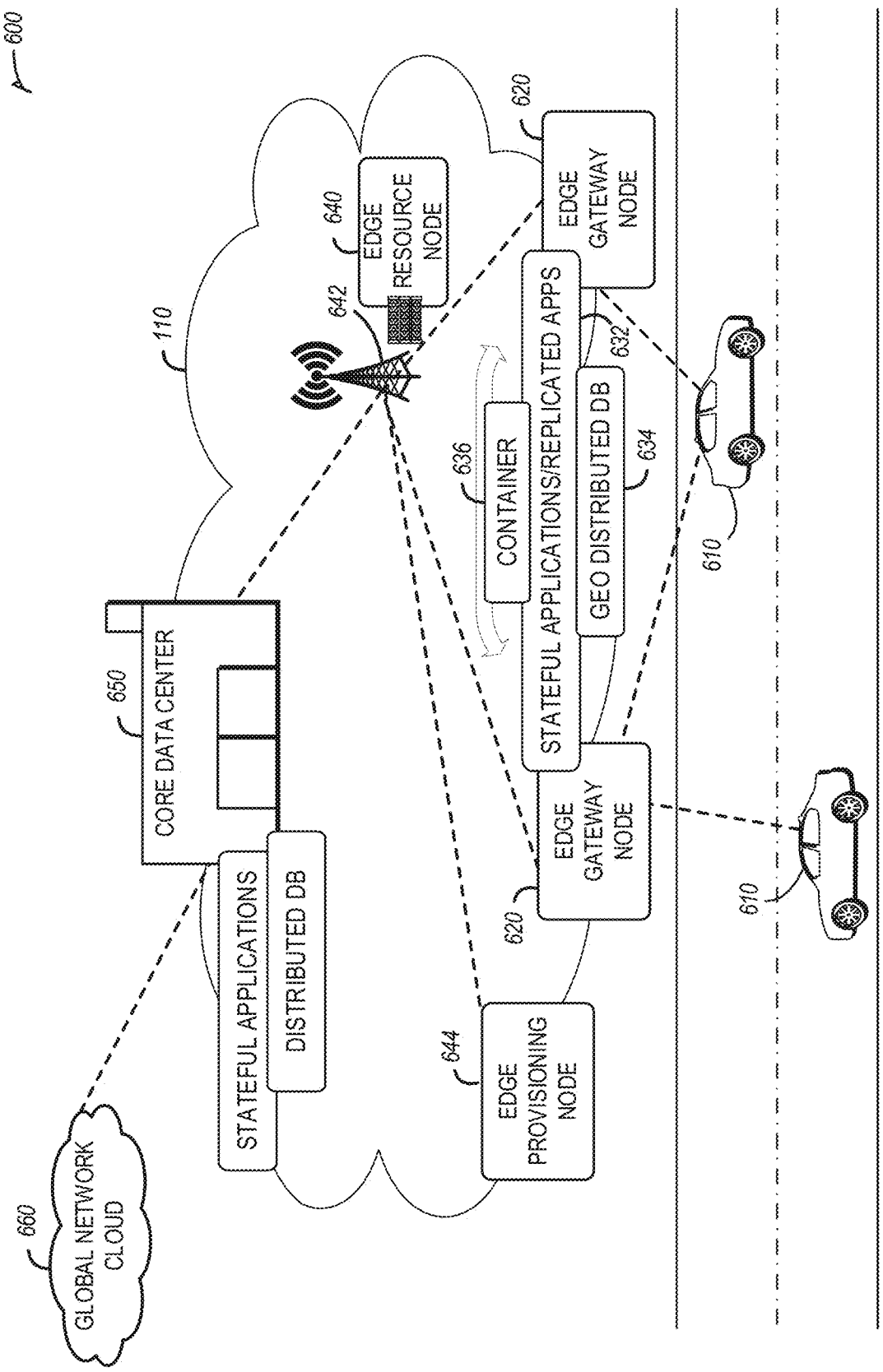
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or moreservers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
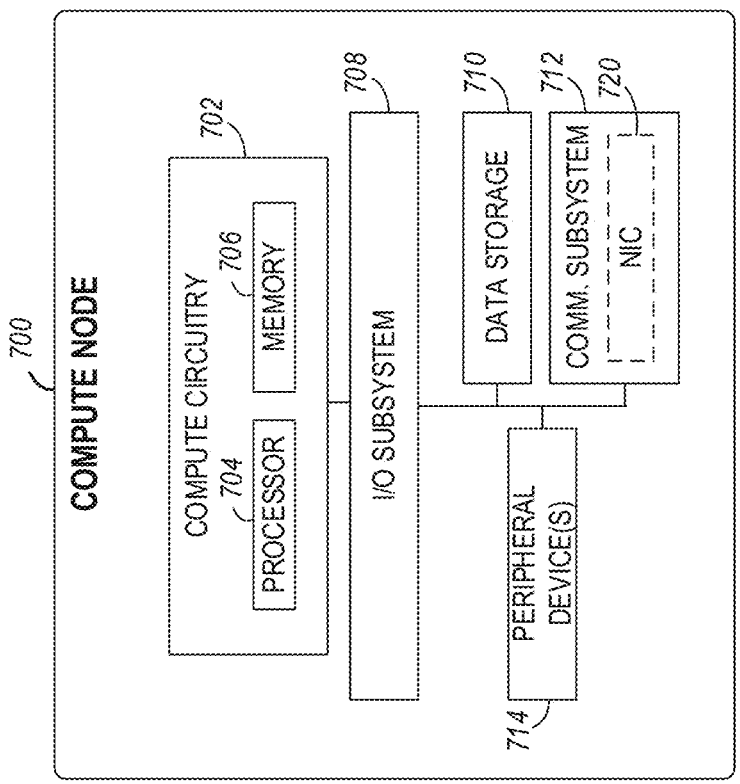
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
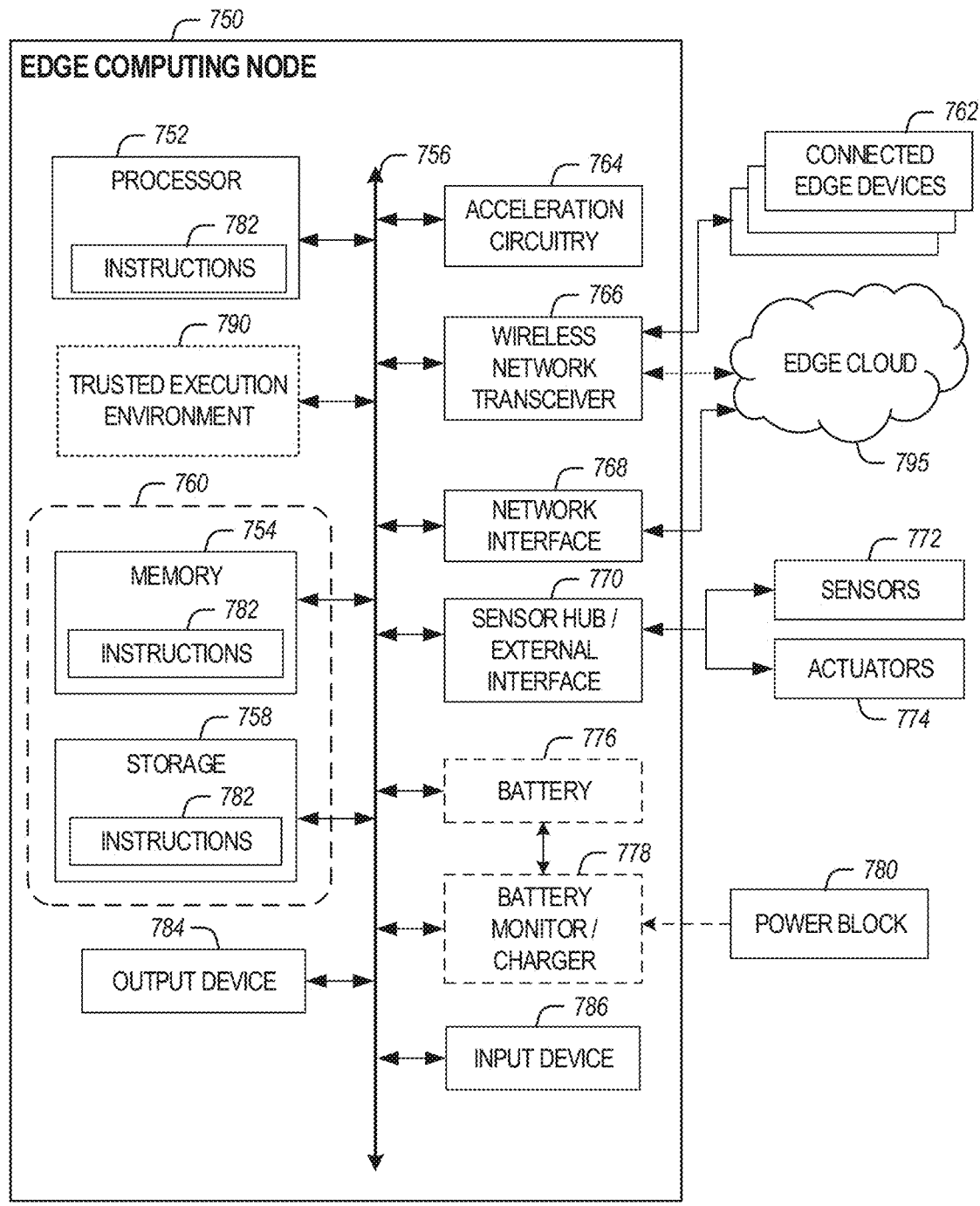
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Overview of Trust Calculus

The following extends trust concepts expressed in *A Calculus for Access Control in Distributed Systems* (MARTIN ABADI, MICHAEL BURROWS, and BUTLER LAMPSON, Digital Equipment Corporation; and GORDON PLOTKIN. University of Edinburgh; 1993). For example, the following table of trust concepts, generally explained in this paper, sets forth a glossary for defining calculus primitives for access control.

Trust calculus primitives may be represented by a postfix equation where the prefix to the operation is a Principal (actor) and the suffix is the Object that results from applying the operation. The primitives below are expressed as <prefix><operation><suffix> format. Uppercase elements are Principals, lower case elements are operators and lowercase bold elements are Objects.

TABLE 1

1) A says s: A makes the statement s. Corresponds to digital signature.
2) A controls s: A is trusted on s: if A says s then s is extant. This is the meaning of A appearing in the ACL for s.
3) A joins B: A is a stronger principal than B. (For example, when B represents a group, A may represent a member or a subgroup of B.) If A says s then B says s, and if B controls s then A controls s. Corresponds to group formation. K joins B corresponds to key generation.
4) A equals B: A joins B and B joins A.
5) B serves A: B is a delegate for A. This can be defined as (((B quotes A) joins B) for A).
6) A union B: A and B in conjunction; (A union B) says s if and only if A says s and B says s.
7) B quotes A: B quoting A; (B quotes A) says s if and only if B says A says s.
8) B for A: B on behalf of A. This can be defined in terms of a fictional delegation server D, as (B union D) IA. If B says A says sand B serves A then (B for A) says s.
9) A as R: A in role R. This can be encoded as A quotes R.
10) A intersect B: the intersection of A and B, if A and B are atomic symbols.
11.) A minus B (e.g A − B): A minus B, if A and B are atomic symbols.

In addition to these primitives, the following primitive is added in the following examples:

TABLE 2

12) A sub B: A is substituted for B; if A then B. Can be used to define variables.

This calculus can be extended for evaluating trust, rather than simply access control, to provide a mechanism for attestation that can be used for verifying trust and ensuring security in edge computing and named function networks. In an example, the terminology for trust calculus and evaluation assigns the following values:

TABLE 3

A = Attester
V = Vendor
C = Component
K = Key
P = Policy
R = Role
s = statement
t = trustworthiness statement Note:
Principals may double as Objects Applying this terminology, the following attestation and trust calculus may be defined, as part of application of a Trusted Computing Group (TCG) Device Identifier Composition Engine (DICE) approach for verifying trust. Specifically, attestation semantics can be defined using the Trust Calculus by assigning attestation roles to principals of the Trust Calculus as follows:

TABLE 4

1) V controls (C union t): manufacturer (or other trusted party) produces a reference assertion t.
2) (K joins V) controls (C union t): manufacturer (or other trusted party) produces a verifiable reference assertion t.
3) P sub ((K joins V) controls (C union t)): A policy P is formed from a verifiable reference.
4) (K joins A) says (C union t): Attestation of t given C. Note: verifier must check that a trusted P contains a (C union t) that matches the attested (C union t).
5) K joins (C union t); DICE key generation; K joins ((C1 union C2) union t); DICE layered key generation.
6) $K_D$ sub (K joins (C union t)); A DICE key instance.
7) (C3 joins C1) joins C0; A DICE layering sequence using a sequence of components.

The serialized expression can be fed into a verification engine for validation of attestation and trust properties in a variety of various edge computing scenarios.

Figure 8:
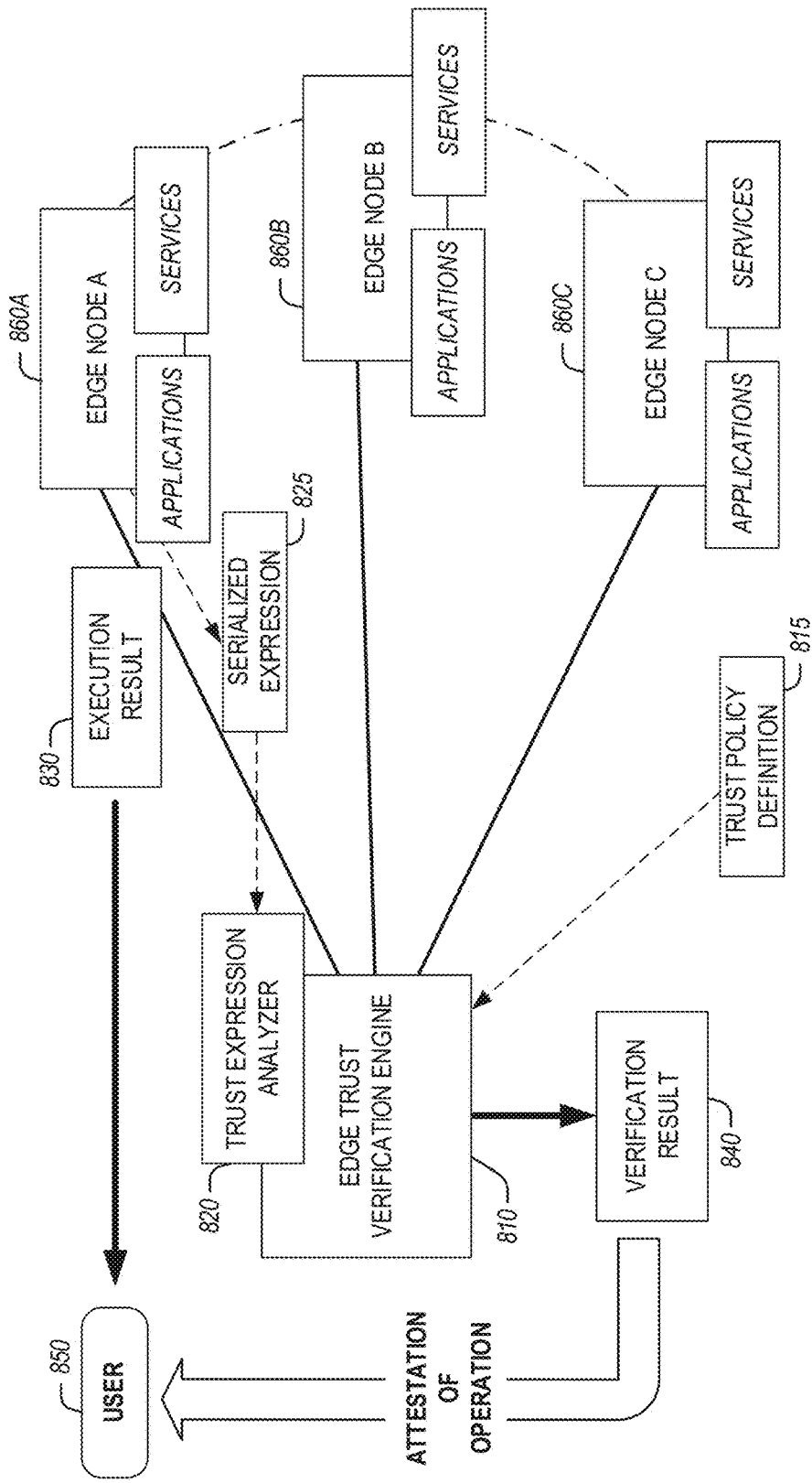
FIG. 8 illustrates a configuration of an edge computing environment, performing evaluation and use of a trust expression established using trust calculus definitions, according to an example.

FIG. 8 illustrates a configuration of an edge computing environment 800, performing evaluation and use of a trust expression established using trust calculus definitions. In the example of FIG. 8, the verification and validation operations may be established with use of implementing components, including a verification engine 810 and a trust expression analyzer 820.

For example, consider a verification engine 810 that evaluates the trustworthiness of applications and services that process edge infrastructure tasks (e.g., with application functions, or services actions), distributed among various edge nodes (e.g., nodes 860A, 860B, 880C). The verification engine 810 determines if the execution result 830 of the edge computing operation complies with expected results, and thus can be attested to a user 850. The verification engine 810 performs this by generating a verification result 840 based on a serialized attestation expression 825, such as is defined with a data definition language, which indicates the properties of attestation to consider. In various examples, the user 850 may be an application, relying party, or agent of the user functioning autonomously or semi-autonomously in an Edge environment. (e.g., as invoked with operations 960 and 1050, discussed below).

Additionally, a representation of the attestation expression 825 using a data definition language can be verified, such as by a trust expression analyzer 820 (which, in some examples, may be integrated into features of the verification engine 810). The use of the trust expression analyzer 820 can be applied to serialized expressions to identify possible insecure logic and untrusted or unexpected states. In an example, the attestation expression 825 can be described in terms of the trust definitions (e.g., provided in Table 4) where attestation definitions (e.g., described in terms of items 4-7 in Table 4) are used to construct attestation evidence having the form of the trust calculus and data description language. Accordingly, the trust expression analyzer 820 also accepts a trust policy definition 815 as input that contains a trust policy (described in terms of items 1-3 in Table 4) where the policy "accepts" the attestation evidence if the logic of the attestation evidence does not contradict the logic of the policy.

In various examples, a validation or non-contradiction result may be binary or expressed in terms of a probability function. For instance, where "acceptance" is fuzzy, the result may be provided in a real value from 0 to 1 confidence that the acceptance criteria is met in actuality (such as based on a given implementation, deployment and other real-world considerations and context).

Figure 9:
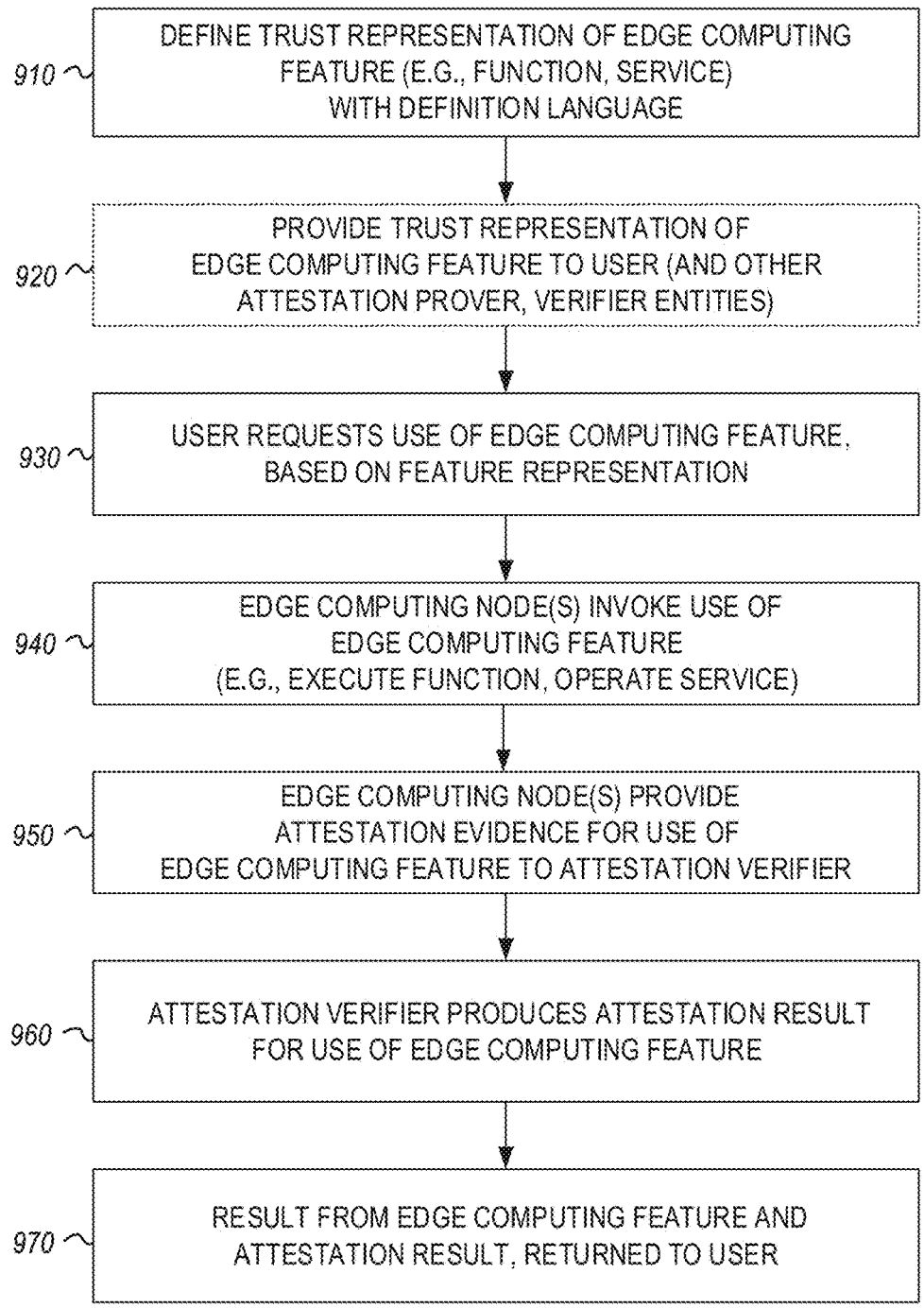
FIG. 9 illustrates a flowchart of an example method for establishing and evaluating trustworthiness in an edge computing environment using trust expressions, according to an example.

FIG. 9 illustrates a flowchart 900 of an example method for establishing and evaluating trustworthiness in an edge computing environment using trust expressions. The following operations of flowchart 900 are described from the perspective of multiple entities and actors in an edge computing environment, but it will be understood that the operations may be coordinated, orchestrated, directed, performed, or caused by specific entities (e.g., an orchestrator, trust manager, etc.).

At operation 910, a trust representation of an edge computing feature (such as a function, service, etc.) is defined with a data definition language, to indicate attestation establishment and verification semantics. This representation is provided to a user, attestation prover, attestation verifier, and other entities, at operation 920, for subsequent operations.

At operation 930, a user requests use of an edge computing feature (e.g., execution of a function, use or operation of an application or service, request for data from a node, etc.), based on the indicated trust representation. At operation 940, one or more edge computing nodes invoke this feature, such as by executing a function, operating a service, or obtaining the data. When invoking this feature, the edge computing nodes produce attestation evidence; this attestation evidence is communicated at operation 950 to an attestation verifier.

At operation 960, the attestation verifier evaluates the attestation evidence, to produce an attestation result regarding the result of the edge computing feature. At operation 970, the computing result from the edge computing feature and the attestation result are communicated to the user. From this attestation result and computing result, can verify that the computing result has been validated by a trusted third party (the attestation verifier).

Figure 10:
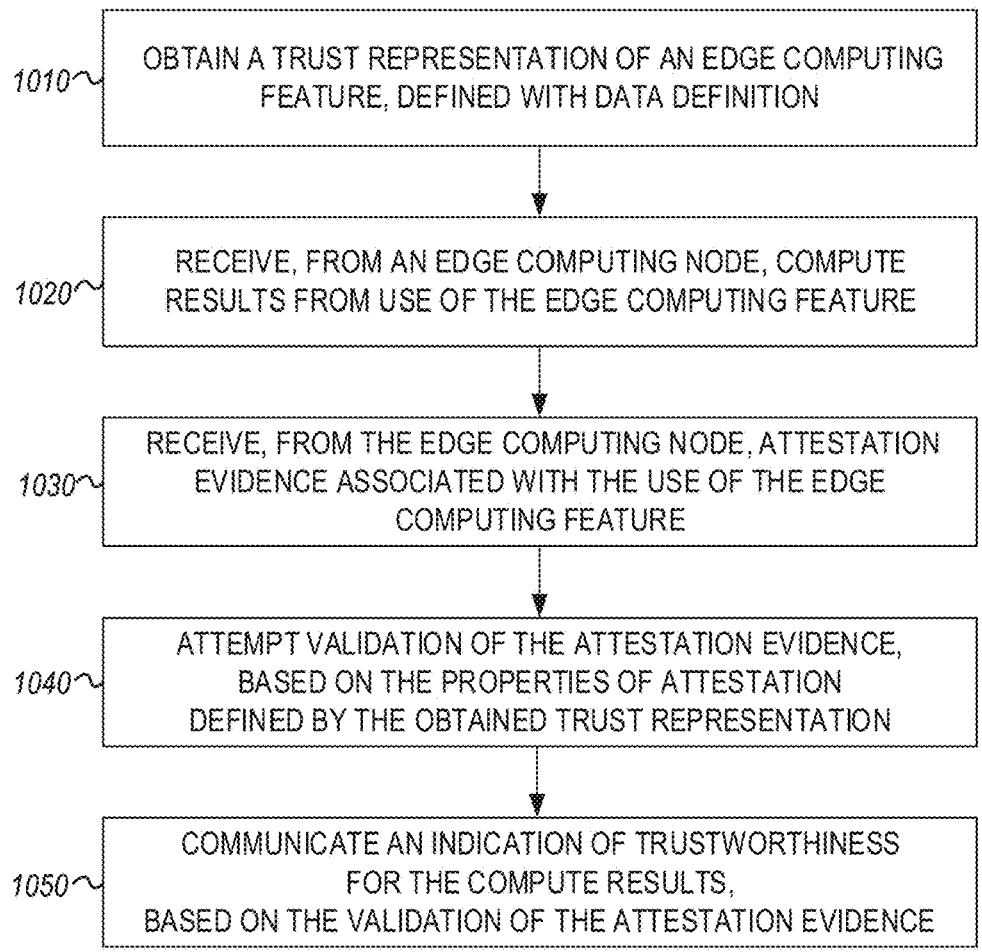
FIG. 10 illustrates a flowchart illustrating an example method for validating trust for an invoked feature of an edge computing environment, according to an example.

FIG. 10 illustrates a flowchart 1000 illustrating an example method for validating trust for an invoked feature of an edge computing environment. In an example, the method of this flowchart 1000 may be performed in whole or in part by an edge computing verification node, whether operating in the role of an orchestrator, named function network (NFN) or named data network (NDN) node, gateway, compute execution node, verification node, or other entities described herein. For instance, such a verification node may be implemented in an orchestrator of an edge computing system, to establish trusted operations of the edge computing feature to be performed among one or more of a plurality of edge computing nodes, as the orchestrator further evaluates one or more identified properties of reliability and quality of service for the use of the edge computing feature.

At operation 1010, the edge computing verification node operates to obtain a trust representation of an edge computing feature, with the trust representation defined according to a trust calculus and provided in a data definition language. As noted in the examples and overviews provided herein, the trust representation may indicate properties of attestation for results (e.g., computing results) from an edge computing feature. In an example, the edge computing feature comprises a computing function, service, or application of the edge computing node, for an edge computing feature configured to be invoked by a user. As also noted in the examples and overviews provided herein, the data definition language may include use of syntax provided from among: JavaScript Object Notation (JSON), JSON Web Token (JWT), CBOR Web Token (CWT), or Concise data definition language (CDDL).

The flowchart 1000 continues at operation 1020, to receive, from an edge computing node, compute results from use of the edge computing feature. In an example, the compute results from the edge computing feature comprise data produced by the computing function, service, or application of the edge computing node. Also in an example, the use of the edge computing feature is provided from at least one of a plurality of orchestrated edge computing nodes, as a controlling orchestrator operates to identify the edge computing node from among the plurality to provide the compute results.

The flowchart 1000 continues at operation 1030 to receive, from the edge computing node, attestation evidence associated with the use of the edge computing feature, and at operation 1040 to attempt validation of the attestation evidence based on the properties of attestation defined by the obtained trust representation. Finally, in this example flow, the flowchart 1000 concludes with operations to communicate an indication of trustworthiness for the compute results, based on the validation of the attestation evidence.

In further examples provided for use of NFN and NDN settings, the trust calculus is used to define trustworthiness of a compute function accessible in a NFN configured to provide at least one named function from among a plurality of edge computing nodes. For instance, a user of the NFN may be enabled to access the at least one named function based on a description of the function and a trustworthiness property indicated in the trust representation.

In further NFN examples, the compute function is provided by the edge computing node with Dynamic Function Composition (DFC), by dynamically composing a new compute function from a plurality of existing compute functions. Further, the compute function may be attestable based on a syntax and semantics of the compute function defined with a function description language in the trust representation. In such NFN examples, the operations (e.g., corresponding to operations 1010-1050, and others described herein) may be performed by a routing or caching node of the NFN, followed by providing the results of the compute results from the NFN to the user.

In an example, the calculus may be used to represent a Composite Principal as a directed acyclic graph or "Tree" Graph. The relationship between the trust calculus and the graphs is further expressed in the following examples of Tables 5, 6, and 7. In these examples, the Attester (A) is a principal in the calculus. The respective graphs describe scenarios where a device may be composed of many Attesters; the respective graphs also describe scenarios where the root de is the lead Attester that has multiple components that rely on the root node for participation in an attestation protocol with a Verifier. The trust calculus defines principals with specialized roles (_R_), and those principals are given special names Attester (_A_) and Verifier (_V_) in the trust calculus.

A principal may consist of a collection of sub-principals in a graph where the root of the tree represents the main principal. A principal attester therefore may consist of a graph of sub-attesters that may be recursively evaluated. The Edge Attestation Calculus may be recursively applied at each sub-component such that a root component may contain the attestation results of the sub-components (if fully verified at each sub-component) or may contain attestation evidence for each sub-component that may be evaluated remotely by a verifier. Components (of the graph) may be named or identified by reference from a central/master/root node. For example, a simple binary tree structure might have a root node C0, a first and second layer 2 nodes C1 and C2 and a fourth, fifth, sixth and seventh nodes at layer 2: e.g. C3, C4, C5 and C6.

For example, consider the following graph:

TABLE 5

----------
C0→C1,
C0→C2,
----------
C1→C3,
C1→C4,
C2→C5,
C2→C6,
----------
Etc.

Also note that principals may be a composition of other principals. For example, a platform may include multiple components (e.g. NIC, FPGA, Core(s), Memory). Each component may have a root of trust that can attest the respective component. One of the components may attest to a cloud service on behalf of the other components. The 'join' primitive may be used to describe this relationship by representing a group of principals as a principal. The group may include a collection of sub-components that form an acyclic graph. For example, a simple tree structure might have a root node C0, a first and second layer 2 nodes C1 and C2 and a fourth, fifth, sixth and seventh nodes at layer 2: e.g. C3, C4, C5 and C6:

TABLE 6

C0→C1→C3
      →C4
  →C2→C5
      →C6
... etc.

The path from root to leaf may be a component identity that is a three-tuple of (C0→C1→C3). Compositions of Principals can be described using the above calculus by using join to show nested groupings. For instance, (C3 joins C1) joins C0. Note that the join operation is used instead of union because union conflates the tree into a single object.

In another example, the tree may be represented using node index values where the first value identifies a vertical position (layer) and second value identifies a horizontal position (node), as indicated in the following table:

TABLE 7

---------------
(0,0)→(1,0),
(0,0→(1,1),
---------------
(1,0)→(2,0),
(1,0)→(2,1),
(1,1)→(2,2),
(1,1)→(2,3),
---------------
Etc.

The path from root to leaf may be a qualified component identity e.g. C0→C1→C3. Compositions of components can be described using the above calculus by using join to show nested groupings. E.g. (C3 joins C1) joins C0. Note: The join operation is used instead of union because union conflates the tree into a single object.

In an example, CDDL and CDDL extensions may be used to implement the presently described trust calculus. CDDL (Concise data definition language) is a notational convention defined by IETF (Internet Engineering Task Force) that may be used to express CBOR (concise binary object representation) and JSON (Javascript object notation) data structures. For instance, CDDL or other concise data definition language syntax can be used to form a grammar of the attestation or other calculus operations. CDDL tools may also generate a machine-readable (e.g. CBOR) serialized expression of the grammar. Consider the following edge-calculus grammar, provided in CDDL:

TABLE 8 edge-calculus = edge-trust-calculus / edge-orchestration-calculus
edge-orchestration-calculus = [ ]
edge-trust-calculus = [principal action-suffix]
principal = {
    principal-name /
    composite-principal : CompositePrincipal /
    "(" principal ")"
}
CompositePrincipal = {
principal-name /
CompositePrincipal "."
}

TABLE 8-continued

```
principal-name = text
action-suffix = saction-suffix / paction-suffix / raction-suffix
saction-suffix = ssuffix / "(" action-suffix ")"
paction-suffix = psuffix / "(" action-suffix ")"
raction-suffix = rsuffix / "(" action-suffix ")"
ssuffix = [saction : ActionsOnStatement statement-or-tstatement]
psuffix = [paction : ActionsOnPrincipals principal]
rsuffix = [raction : ActionsOnRole role]
ActionsOnPrincipal = &(
        ?joins : 3 /
        ?equals : 4 /
        ?serves : 5 /
        ?union : 6 /
        ?quotes : 7 /
        ?as : 9 /
        ?intersect : 10 /
        ?minus : 11 /
        ?sub: 12
)
ActionsOnStatement = &(
?says : 1 /
        ?controls : 2
)
ActionsOnRole = &(
?for: 8
)
role = text              ;Constrained by an owner defined roles listing
statement-or-tstatement = {statement / tstatement}
statement = text         ;Constrained by not being a principal
tstatement = text ;Constrained by a standardized list of statements that have trust semantics
```

Principals resolve to 'text' by the grammar, but it is expected that the value is an identity having uniqueness properties such as a UUID, or URI. They may also be composed of multiple values that establish identity such as a postal address, product name consisting of a vendor, model, version, or an X.509 Common Name.

In further examples, action control operators may be used to express actions related to trust. For instance, the trust calculus may extend the CDDL language to allow CDDL expressions that natively encapsulate trust calculus semantics.

The following action control operator definitions may extend a future revision of the CDDL language. These extensions allow CDDL expressions to be type enforced. Type enforcement is a form of code execution integrity that allows the execution to be monitored and violates of 'type' such that logic errors can be detected and execution altered to avoid security error such as privilege escalation. For instance, consider the CDDL grouping structure: My-group=((A .joins B), t). This operator asserts to a trust evaluation engine that My-group is a well-formed expression of the group membership established using cryptographic mechanisms (e.g., such as a using bilinear maps over elliptic curve groups (i.e. EPID)), or may inform an orchestrator that a cryptographic group membership method must be applied in order to realize the My-group data structure. The operator also asserts that A, B, and t are well-formed principals and provides trust statements according to the above define grammar.

For instance, consider the following operations, usable by attestation functions:

TABLE 9

| | Name | Description |
|---|---|---|
| 1 | .says | A makes the statement s. Corresponds to digital signature. |
| 2 | .controls | A is trusted on s: if A says s then s is extant. This is the meaning of A appearing in the ACL for s. |
| 3 | .joins | A is a stronger principal than B. (For example, when B represents a group, A may represent a member or a subgroup of B.) If A says s then B says s, and if B controls s then A controls s. Corresponds to group formation. K joins B corresponds to key generation. |
| 4 | .equals | A joins B and B joins A. |
| 5 | .serves | B is a delegate for A. This can be defined as (((B quotes A) joins B) for A). |
| 6 | .union | A and B in conjunction; (A union B) says s if and only if A says s and B says s. |
| 7 | .quotes | (B quotes A) says s if and only if B says A says s. |
| 8 | .for | B on behalf of A. This can be defined in terms of a fictional delegation server D, as (B union D) IA. If B says A says s and B serves A then (B for A) says s. |
| 9 | .as | A in the role of R. This can be encoded as A quotes R. |
| 10 | .intersect | the intersection of A and B, if A and B are atomic expressions of principal groups. |
| 11 | .minus | A minus B subtracts B from A if A and B are atomic expressions of principal groups. |
| 12 | .sub | A is substituted for B; if A then B. Can be used to define variables |

Because there is a machine-readable data definition (CDDL) of the calculus and because the calculus can describe attestation and trust semantics, the various edge ecosystem stakeholders are able to dynamically evaluate trust, and not just attributes (from tag-values or other properties). This is especially important when considering scenarios where workloads are to be distributed among several possible hosting or execution environments, each having different trustworthiness properties.

A CDDL expression may be used to describe Edge/Cloud orchestration that easily integrates the attestation flows. Accordingly, the flows described and depicted with reference to FIGS. 8 to 10 can become machine readable using CDDL expressions; and the attestation calculus can be encapsulated by these operations to create a seamless attestation-aware expression.

As one example of use of the trust calculus in an edge computing environment, a trust orchestrator may be required to evaluate a distributed execution plan trustworthiness as a pre-condition of scheduling the workload. Scheduling and trust evaluation may be iterative or recursive where the objective of evaluation is to optimize for both trust and performance. Trustworthiness may not be easily mapped to a scalar range (e.g. high, medium, low) but rather may be dynamic according to known vulnerabilities, known patches and product innovations that are incorporated into edge infrastructure following various product deployment lifecycles.

In further examples, there is an opportunity to automate an additional need to capture the third-party data responsibilities that emanate from the trust calculus. As one example: Do the digital rights management (DRM) policies (codified in the trust calculus) mesh well together, or do they create potential for DRM violations? As another example: Are the data privacy regulations covering different labeled groups of data (e.g., European Union General Data Protection Regulation (GDPR) provisions) met in different stages of storage and computing?

Also in further examples, the trust calculus may be extended to ensure that resources that exceed a threshold may have access control consequences tied to trust. For instance, there may be various ways to ensure a different enforcement consequence as part of the trust provisions. (Allow, deny, sandbox-allow, etc. . . . )

It will be understood that the applicability of trust calculus in edge computing scenarios is applicable to a variety of settings and use cases. For example, consider car makers which are requesting a framework for the definition of trust and data access control, as they plan to use ETSI MEC (Multi-Access Computing) for V2X (vehicle-to-everything) services. In a V2X setting, various data structures and communications may be used to provide a definition of the trust calculus representation. For instance, in V2X, MEC, and other dynamic communication settings, a trust calculus could be represented with data in a JSON data format, and exposed through various channels (e.g. through a RESTful API). Such data can be coupled with a certain classification of information, such as in the form of a three-dimensional Trust Matrix, mapping data to stakeholder and to access rights, adding options consent options (such as to refer to or implement GDPR regulations), and the like.

Applicability of Trust Calculus to Functions and Operations in Information Centric Networking and Named Function Networks The following paragraphs also provide details of how a trust calculus may be extended to ensure trustworthiness of compute functions executed in named function network settings. Named Function Networks (NFNs) are an extension that enables an Information Centric Network (ICN) implementation to invoke an on-demand function or computation, and subsequently to deliver the results to requesting users. An NFN enables a network to optimize where a computation is executed, in addition to optimize from where to marshal data that was already published.

As is well understood, an NFN also allows in-network resolution of expressions. In conventional NFN implementations, users must know the name of the function to invoke the function on the network. If a user does not know the name of the function or whether the function possesses certain desirable properties, a directory may be used to associate function names with their properties. However, many issues may occur if the function does not currently exist in the NFN or its directory based on a desired set of properties, or if the user wants a variation of an existing function.

In the following description, methods, configurations, and related apparatuses are disclosed for generating functions "on-the-fly" in NFN networks, or compositing such functions (e.g., combining two or more parts of the functions), while ensuring trustworthiness of the functions. In conventional NFN implementations, if a user wants to change or improve a function, using other attributes, characteristics, or features found in other functions, a user is unable to accomplish the task. Examples disclosed herein permit a user to describe or otherwise define a function with a trust definition, and then defer to the system/network to generate the function on-the-fly, including compositing (e.g., combining two or more parts for a function) where applicable.

Along with a dynamic definition of a function, ensuring properties of trustworthiness may be added to functions and data for the NFN. Other properties may also be included such as robustness, survivability, scalability, performance, and the like. The disclosed examples also include empowering automation of dynamic construction of new functions from existing functions—also known as Dynamic Function Composition (DFC). Doing so permits scale and flexibility in highly distributed networks with diverse capabilities, without any central loci, to empower and automate operations at scale, including cataloguing knowledge, mapping requests. DFC allows a user or a machine to realize this value based on a traditional NFN operational semantics, such as for matching a computational interest to existing computational capabilities that then are empowered to be reconstituted as new NFN functions. Automation of this capability may be facilitated by metadata and use of a function description language (FDL), for example.

The examples described herein provide significant technical advantages for NFNs and similar deployments. For example, with the following approaches, customers and other user entities can deploy NFNs in an Edge FaaS infrastructure. Doing so allows new composite functions generated on-the-fly to aid, such as for machine learning and deep learning deployments, with increased scalability because the automatic compositing of functions avoids hand configuration of such service chaining, as well as improved security and robustness due to attestation of both the data and the functions marshalled for execution. The examples disclosed herein also provide attestation (and an attestation provider/verifier) nodes that help ensure the integrity of NFN functions (code, script, executables, and the like).

Overview of Information Centric Networking

The examples disclosed herein may be implemented within the purview of ICN. ICN is an umbrella term for a networking paradigm in which information and/or functions themselves are named and requested from the network instead of hosts (e.g., machines that provide information). To get content, for example, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices. A similar process may occur when a device requests the network perform a function.

Figure 11:
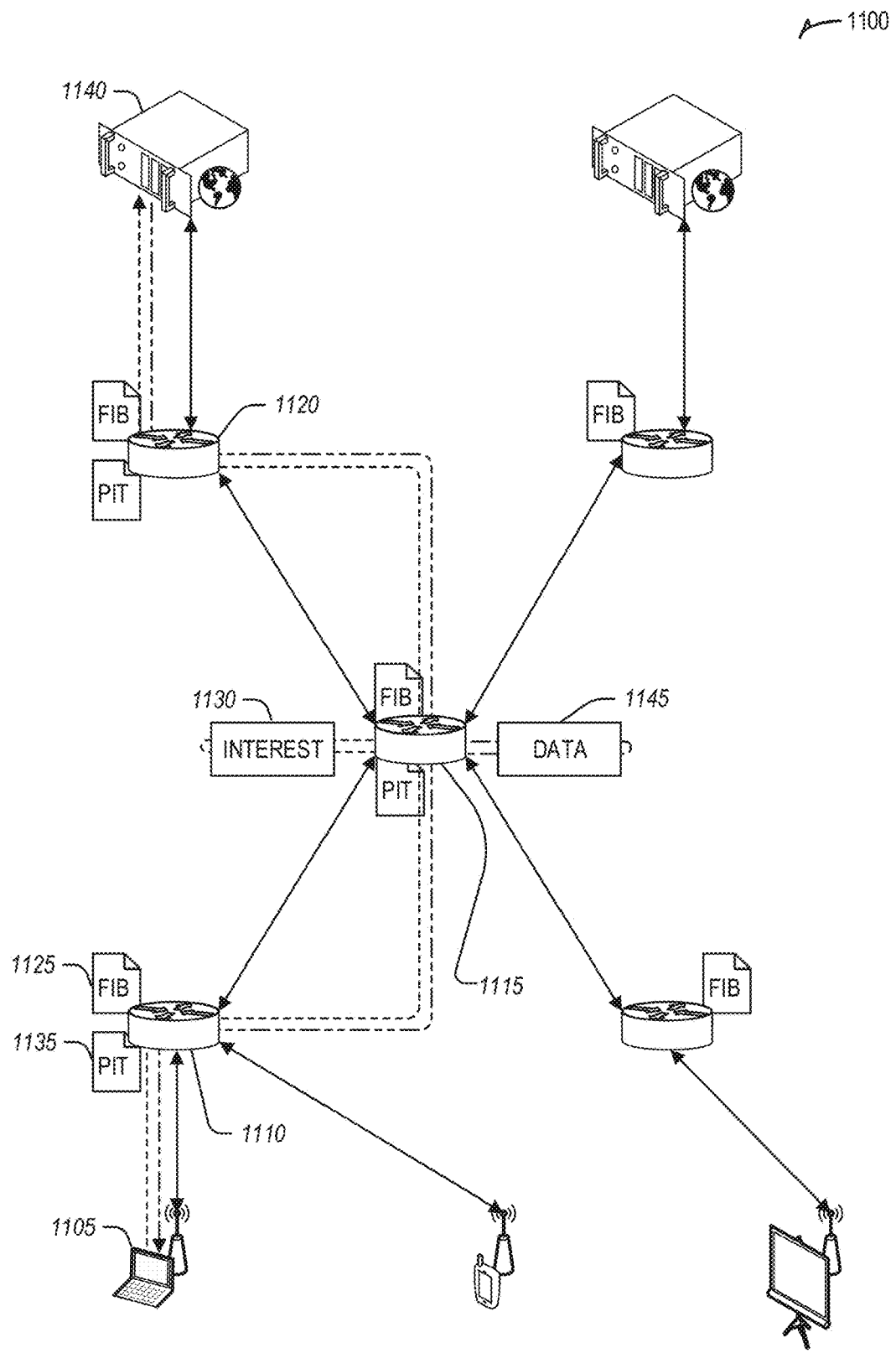
FIG. 11 illustrates an example information centric network (ICN), according to an example.

FIG. 11 illustrates an example ICN, according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1105 (e.g., subscriber) requests named content from the network itself. The content request may be called an interest and transmitted via an interest packet 1130. As the interest packet traverses network devices (e.g., network elements, routers, switches, hubs, etc.)—such as network elements 1110, 1115, and 1120—a record of the interest is kept, for example, in a pending interest table (PIT) at each network element. Thus, network element 1110 maintains an entry in its PIT 1135 for the interest packet 1130, network element 1115 maintains the entry in its PIT, and network element 1120 maintains the entry in its PIT.

When a device, such as publisher 1140, that has content matching the name in the interest packet 1130 is encountered, that device 1140 may send a data packet 1145 in response to the interest packet 1130. Typically, the data packet 1145 is tracked back through the network to the source (e.g., device 1105) by following the traces of the interest packet 1130 left in the network element PITs. Thus, the PIT 1135 at each network element establishes a trail back to the subscriber 1105 for the data packet 1145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1130 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 1130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1130 to data cached in the ICN element. Thus, for example, if the data 1145 named in the interest 1130 is cached in network element 1115, then the network element 1115 will return the data 1145 to the subscriber 1105 via the network element 1110. However, if the data 1145 is not cached at network element 1115, the network element 1115 routes the interest 1130 on (e.g., to network element 1120). To facilitate routing, the network elements may use a forwarding information base 1125 (FIB) to match named data to an interface (e.g., physical port) for the route. Thus, the FIB 1125 operates much like a routing table on a traditional network device.

In an example, additional meta-data may be attached to the interest packet 1130, the cached data, or the route (e.g., in the FIB 1125), to provide an additional level of matching. For example, the data name may be specified as "www.somedomain.com or videos or v8675309," but also include a version number—or timestamp, time range, endorsement, etc. In this example, the interest packet 1130 may specify the desired name, the version number, or the version range. The matching may then locate routes or cached data matching the name and perform the additional comparison of metadata or the like to arrive at an ultimate decision as to whether data or a route matches the interest packet 1130 for respectively responding to the interest packet 1130 with the data packet 1145 or forwarding the interest packet 1130.

ICN has advantages over host-based networking because the data segments are individually named. This enables aggressive caching throughout the network as a network element may provide a data packet 1130 in response to an interest 1130 as easily as an original author 1140. Accordingly, it is less likely that the same segment of the network will transmit duplicates of the same data requested by different devices.

Fine grained encryption is another feature of many ICN networks. A typical data packet 1145 includes a name for the data that matches the name in the interest packet 1130. Further, the data packet 1145 includes the requested data and may include additional information to filter similarly named data (e.g., by creation time, expiration time, version, etc.). To address malicious entities providing false information under the same name, the data packet 1145 may also encrypt its contents with a publisher key or provide a cryptographic hash of the data and the name. Thus, knowing the key (e.g., from a certificate of an expected publisher 1140) enables the recipient to ascertain whether the data is from that publisher 1140. This technique also facilitates the aggressive caching of the data packets 1145 throughout the network because each data packet 1145 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, named data networking (NDN), as specified in the NDN technical report DND-0001, and NFNs, which may be provided as an extension of NDN implementations and standards.

NFN Function Generation and Attestation

Figure 12:
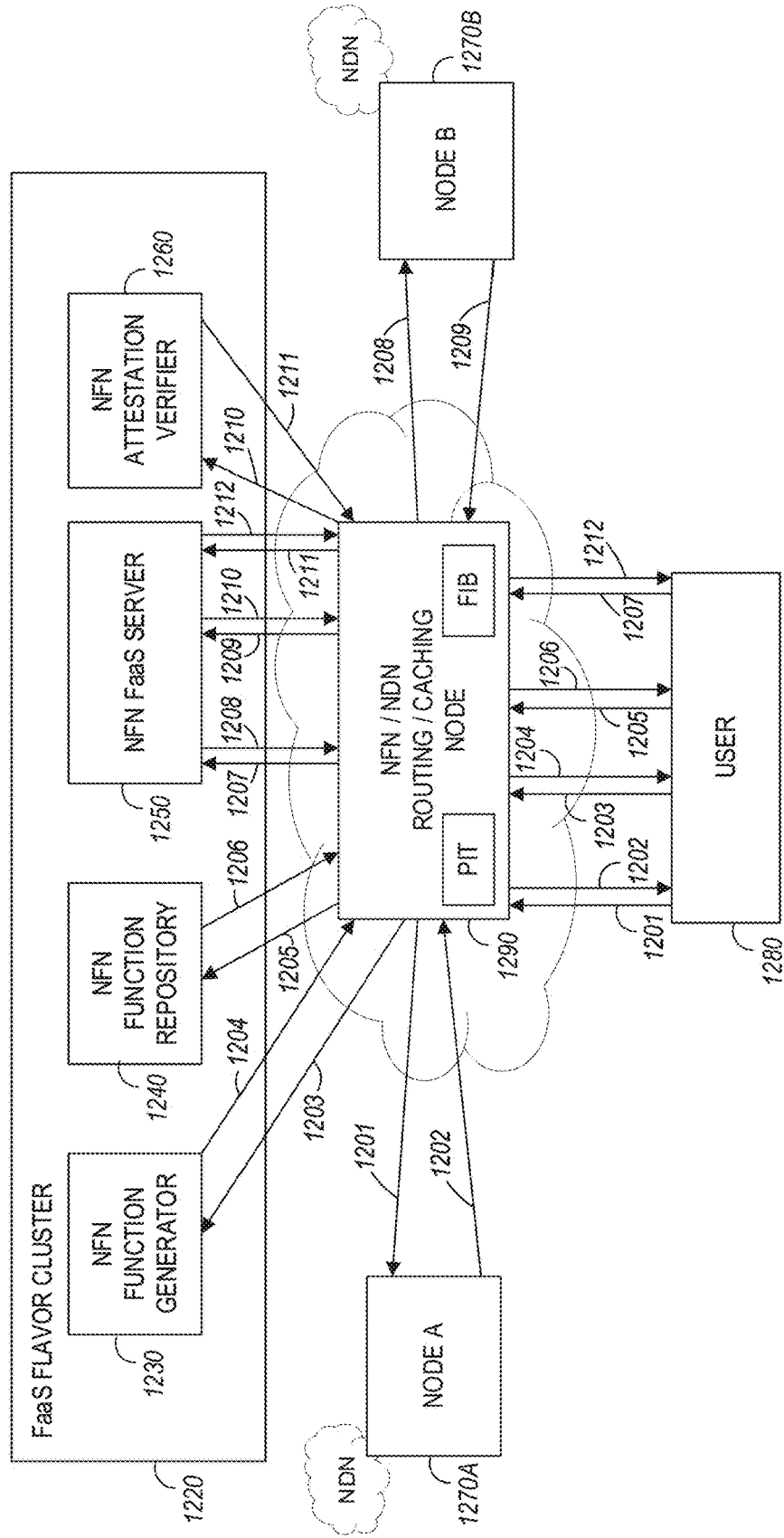
FIG. 12 is a diagram illustrating an example showing named function network (NFN) generation and function attestation services integrated into a function-as-a-service (FaaS) cluster, according to an example.

FIG. 12 is a diagram 1200 illustrating an example of NFN function generation and function attestation services integrated into a cluster 1220 of various function-as-a-service (FaaS) "flavors" in an NFN and named data networking (NDN) network, such as implemented with a variation of the ICN network illustrated in FIG. 11. Specifically, an example workflow may be implemented in an Edge, IoT, or Cloud services environment where an NDN/NFN abstraction is used to dynamically implement a compute workload among a combination of computing nodes.

The following aspects of function generation and attestation provide two capabilities not currently associated with conventional NDN/NFN networks: (1) the use of an NFN function generator service (e.g., via NFN function generator 1220) that accepts an abstract syntax definition of a workload that can be decomposed into simple functions consistent with a Cloud or Edge FaaS architecture; and (2) automated instrumentation of device attestation into functions such that an attestation verifier (e.g., via NFN Attestation Verifier 1260) is able to enforce a policy to ensure that NDN data is consistently protected, even though NDN/NFN networks place a layer of abstraction over the physical devices that make up the network.

In diagram 1200 of FIG. 12, a series of steps are shown that represent a series of interest and data messages that may update PIT and FIB resources in a central routing node 1290. For simplicity sake, only one Routing Node 1290 is shown. The other satellite nodes 1270A, 1270B represent endpoints that may either supply data or functions, or execute functions. In this diagram 1200, the communications provided by these steps include:

Step 1201 (from User 1280 to Node A 1270A): The Function Definition Language (FDL) for a function Fn( ) may be provisioned by a management process or a user. The management process or user may construct a function from an FDL. In this example, the User 1280 shows interest in $FDL_{Fna}$. Node A 1270A is an NDN node that knows $FDL_{Fna}$. This example combines an FDL for attestation ($FDL_{att}$) with an FDL for the function Fn (e.g. $FDL_{Fn}$) to produce a resulting attestation-aware FDL ($FDL_{Fna}$=combine($FDL_{att}$, $FDL_{Fn}$)).

Step 1202 (from Routing Node 1290 to User 1280): The $FDL_{Fna}$ is delivered to the User 1280.

Step 1203 (from User 1280 to Function Generator node 1230): The user requests a function generation interest for a function "fn" supplying $FDL_{Fna}$ as an input value. The Routing Node 1290 forwards the interest packet to the NFN Function Generator node 1230.

Step 1204 (from Function Generator node 1230 to User 1280): The Function Generator node 1230 contains/accepts an FDL and creates an NFN function. In this step, the $FDL_{Fna}$ is input to the Function Generator 1230 and produces a function Fn( ). The function Fn( ) is returned to the User 1280.

Step 1205 (from User 1280 to Function Repository 1240): Fn( ) is added to the NFN Function Repository 1240. Fn( ) may also be cached in the FIB of the Routing Node 1290.

Step 1206: (from Function Repository 1240 to User 1280): The Function Repository 1240 and/or Routing Node 1290 return a directory entry for Fn( ) to the User 1280 satisfying the interest packet from step 1201.

Step 1207 (from User 1280 to FaaS Server 1250): The User 1280 shows interest in executing a function named "Fn" using data values data1 and data2. The User sends "Fn", "data1" and "data2" to the Routing Node 1290 who forwards it to an NFN FaaS Server 1250. The FaaS Server 1250 performs function execution plus localized orchestration with the following steps 1208-1211.

Step 1208 (from FaaS Server 1250 to Node B 1270B): The FaaS Server 1250 generates interest packets for the function input parameters data1 and data2. Interest in fn( ) is delivered to the Routing Node 1290 which may have the Fn( ) cached (see step 1205). The function Fn( ) and data value interest is sent to the available NDN data repositories (e.g. Node B 1270B). Note that the FaaS Server 1250 may have previously showed interest in executing "Fn" functions. If the particular FaaS flavor specializes in a class of function (e.g. AI, web search, graphics and media, financial operations, etc.) the NDN/NFN interest packets may contain "class-of-function" names as part of the interest packet.

Step 1209 (from Node B 1270B to FaaS Server 1250): The FIB/Function repository 1240 returns the function fn( ) and Node B 1270B returns data1 and data2 to the Routing Node 1290. The routing node may add data1 and data2 to its FIB.

Step 1210 (from FaaS Server 1250 to Attestation Verifier 1260): The FaaS Server 1250 executes the fully formed function Fn(data1, data2). As part of Fn( ) execution, the attestation preamble executes, which results in attestation evidence about the device hosting the FaaS Server 1250. Attestation evidence is supplied to the Routing Node 1290 which forwards it to the Attestation Verifier 1260. Note that the Attestation Verifier 1260 may have previously registered interest in attestation evidence data. The PIT therefore contains a pending interest in attestation evidence.

Step 1211 (from Attestation Verifier 1260 to FaaS Server 1250): In step 1210, the Attestation Verifier 1260 returns an attestation result. Upon receipt of attestation results at the Routing Node 1290, the pending PIT interest can be satisfied. The attestation result is then delivered to the FaaS Server 1250 and/or the user nodes. The FIB of the Routing Node 1290 is updated with attestation results. Note that the user 1280 also may have registered interest in an attestation results as part of step 1205 or step 1207. Also note that the FaaS Server 1250 may have registered interest in attestation results as part of step 1210.

Step 1212 (from FaaS Server 1250 to User 1280): The FaaS Server 1250 node executes Fn(data1, data2). The FaaS Server 1250 may have an attestation policy that requires the attestation result to be in the affirmative. In this example, the attestation result authorizes completion of the function. The function results are returned to User 1280 in response to the Step 1205 interest. Note that in a different example, the user may show interest in an attestation result (communicated via Step 1211) and evaluate the attestation result in concert with the function execution result (communicated via Step 1212). For example, the User 1280 may accept the function result but respond to it differently based on the attestation result. (For instance, the result might supply a O2 sensor reading that is unreliable and therefore seek a second reading or a show interest in another FaaS Server (not shown).

As will be understood, the role of NFN operations in this setting essentially provides a role of orchestration. Such NFN operations may be extended as shown above for use with FFaaS (Flavor Function as a Service) implementations; FFaaS provides a cluster of FaaS services that have embedded or intertwined orchestration. Normally in FaaS settings, the NFN orchestrates the construction of the function call. However, in FFaaS the function call orchestration and function call execution are intertwined such that the output of the FFaaS is a function execution result. That result can appear to the larger NFN as a data input into another function orchestration event in an NFN.

Edge Calculus expressed as a CDDL implies the NFN orchestration function can be controlled using a CDDL. The extensions for attestation implies the operations extensions (see Table 9) can be used to intertwine execution with orchestration. Accordingly, the configuration of FIG. 12 provides a new type of NFN that accomplishes both orchestration and execution, where FFaaS may appear as a substructure of the Edge calculus CDDL expression.

In further examples (not shown in FIG. 12), multiple attestation verifiers may be deployed or made available, such as for use in case one verifier fails. Additionally, multiple FaaS Flavor Clusters may be deployed for purposes of reliability and load balancing. Other aspects of orchestration, redundancy, and coordinated operations may be provided among the verifier, function generator, function repository, and function execution servers.

Figure 13:
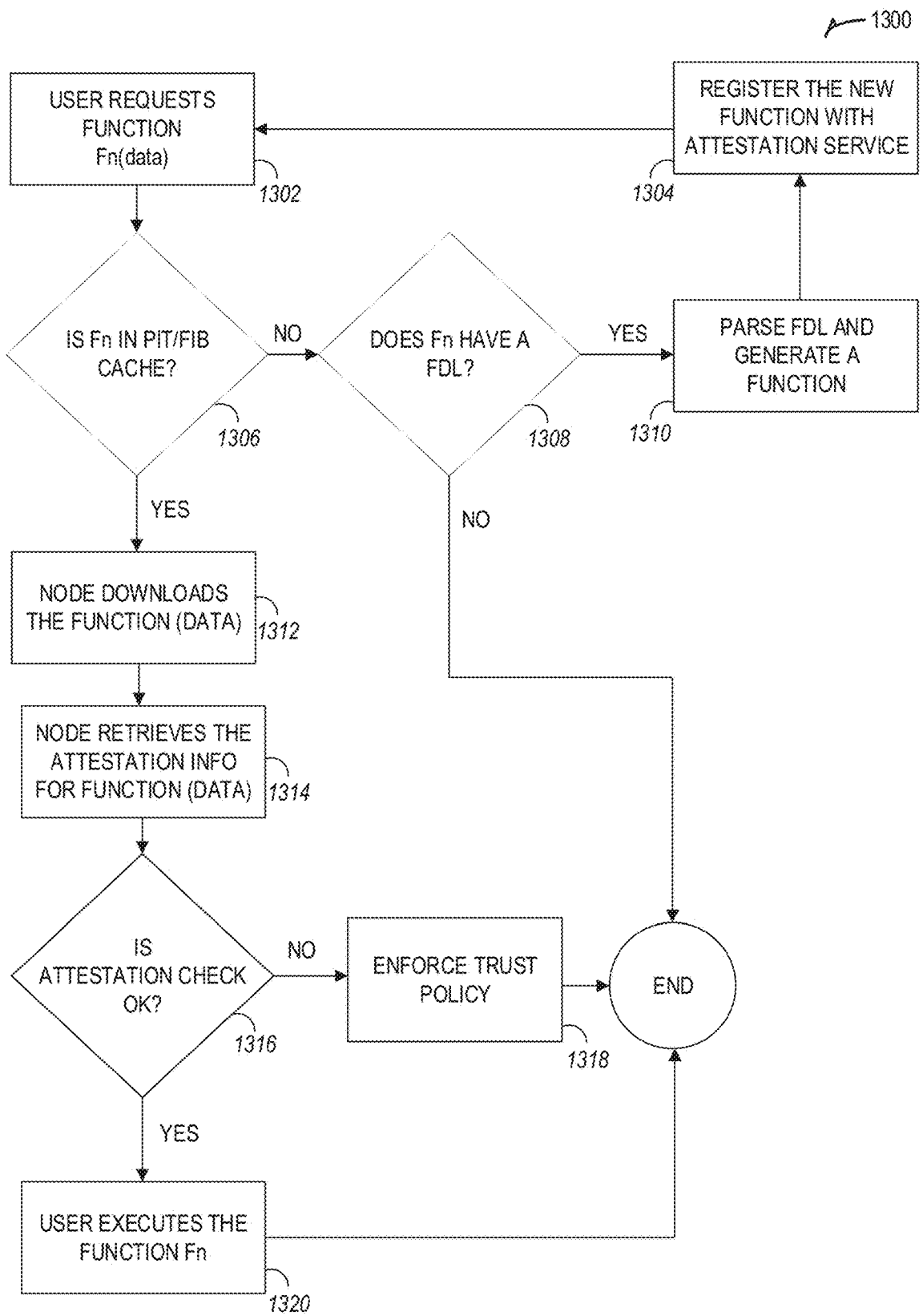
FIG. 13 is a flowchart illustrating a flow of function generation from attestation aware function definition language (FDL) to function execution involving a runtime attestation check.

FIG. 13 is a flowchart 1300 illustrating a method where an NFN function is created from an FDL in order to satisfy an NFN interest request for executing the function. FIG. 13 further illustrates the instrumentation of the created function for attestation and performance of an attestation check as part of an NFN function execution workload. For the example illustrated in FIG. 13, the attestation of data and functions are transparent to the user in an NFN network.

At operation 1302, the user requests execution via a function Fn(e.g., Fn(Data)) available via the NFN. If Fn is located in the PIT/FIB cache of the routing node (determination 1306), then the node may proceed to download the function (operation 1312), and retrieve the attestation information for the function (operation 1314).

If the function is not in the routing node's PIT/FIB cache (determination 1306), but the function has an FDL definition (determination 1308), operations are performed to register and attest this function. This includes the parsing of the FDL, to generate a suitable function (operation 1310), and registration of the function with an attestation service (operation 1304). The operations to download the function (operation 1312) and retrieve the attestation information for the function (operation 1314) then may be performed. If the function does not have an FDL definition (determination 1308), the function cannot be generated and attested, and is not executed.

Remaining operations in the flowchart 1300 include providing an evaluation of the attestation information (determination 1316); if attestation information cannot be validated, then a trust policy is enforced and the function is not executed (operation 1318), whereas if attestation can be validated, then the user can proceed to execute the function Fn (operation 1320). Additional operations discussed in the examples or illustrated in the figures above may also be added or modified.

As an extension to the examples of FIG. 13, multiple attestation services may be registered with different levels or performance and reliability. Also, an attestation process may also itself be tied to use of an SLA (e.g., to require attestation to be completed in some period of time, such as completion of attestation in 10 ms). Also, data itself processed by the function may need attestation before processing. Accordingly, it will be understood that multiple forms of functions and data can be attested within the scenarios of FIGS. 12 and 13, and extended for use in NFN/NDNs.

Overview of Attestation

Figure 14:
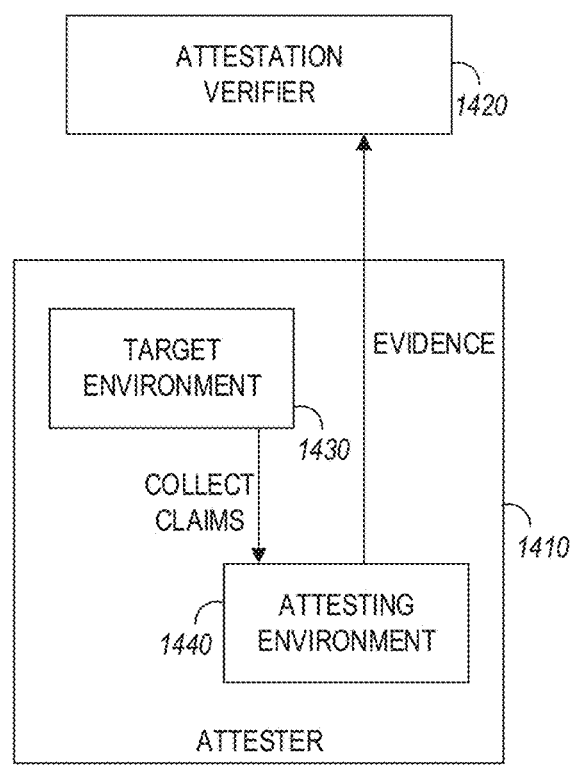
FIG. 14 is a diagram illustrating an attester that includes two environments, according to an example.

FIG. 14 depicts an example use of an attestation environment 1440, such as an attestation environment dynamically established with the NFN/NDN functions, or dynamically deployed in a configuration of the edge computing systems discussed above. The function generator and function verifier share a common understanding of the attesting environment 1440 (AE) and a target environment 1430 (TE). The AE 1440 collects attestation claims about the TE 1430.

Collecting attestation claims requires the AE 1440 to prescriptively 'walk' the TE 1430 to determine the full scope of relevant properties. For example, the AE 1430 may visit a sequence of memory pages or read an executable file format such as Common Object File Format (COFF), Executable and Linking Format (ELF), or other variations. The 'walking' algorithm is shared by the attestation verifier 1420 in order for the verifier to validate reference measurements describing the TE 1430.

Examples disclosed herein define an attestation statement 't' that is a statement about trust. The statement 't' contains the elements that contribute to the operational state of a trusted computing base (TCB). A data definition language may be used to precisely describe 't'. For example, the following CDDL describes a CBOR token for Unprotected CWT Claims Sets (UCCS):

TABLE 10

```
<TBD601>(
  {
    / iss / 1: "coap://as:example:com",
    / sub / 2: "erikw",
    / aud / 3: "coap://light.example.com",
    / exp / 4: 1444064944,
    / nbf / 5: 1443944944,
    / iat / 6: 1443944944,
    / cti / 7: h'0b71',
    / security-level-claim / 8: h'01',
    / ueid-claim / 9: h'DEEPBAAF1234...'
  }
)
```

This identifies a CDDL expression of a TCB component (the Target Environment 1430, as represented by statement 't'). For instance, a Function Generator (e.g., NFN function Generator 1230 in FIG. 12) may use 't' to describe the statements that may contribute to a message digest used to create a TCB Component Identifier (TCI) and a DICE Compound Device Identifier (CDI). These values are also used to generate an attestation key or key pair.

Accordingly, the attestation data/Evidence ('t') can be published in an NDN/NFN so that other nodes (e.g., Verifiers) can show interest in it. Attestation Evidence should be protected (e.g., digitally signed) so that such evidence can be cached in an NDN/NFN routing nodes without losing the authenticity of the device that generated it. The attestation evidence may be provided in any number of encoded data formats or definition languages, and is not limited to the examples provided herein; as referenced above, CWT—CBOR Web Token is an IETF standard for how to sign CBOR encoded data; CDDL is used to describe the CWT token structure; UCCS is CWT without the digital signature and is used as an example Attestation data/Evidence in Table 10.

In the NDN/NFN example of FIG. 12, discussed above, the Function Generator 1230 becomes a supplier of 't' to the NDN. The Function Verifier shows interest in 't' by one of its names. For example, the ueid-claim in Table 10 above. In an NDN/NFN, the Verifier may show interest in specific values that are claimed attributes of the attesting principal. In Table 3, the value "t" makes a trustworthiness statement. A UEID-claim is an example of a "t" value, that can be asserted as attestation data. Trust calculus rules (e.g., as identified in Table 4—the first one) are expressions that bind 't' to principals.

Thus, in an NDN/NFN setting, when the function verifier receives an attestation event from the FaaS server (e.g., in FIG. 12—step 1210), the function verifier uses 't' to direct verification steps that includes computing a hash of 't' that matches the digest used to construct the TCI value. The verifier is able to precisely compute the digest because 't' is unambiguous and is used by both the FaaS Server (to compute the attestation evidence digest value) and by the function verifier to compute the reference digest that is used to compare to the evidence.

Such use of attestation in an NDN/NFN setting can be compared to the edge computing examples of FIG. 8, discussed above, as follows. Each Edge Node (A, B, C . . . ) provides an implementation of an Attester where the functionality of the Attesting Environment is domain isolated from the functionality of the Target Environment. Domain isolation may consist of TEE technology (e.g., Intel SGX, ARM TrustZone), virtualization technology such a VT-x, IP blocks such as a co-processor, xPU or FPGA, or container technology such as KATA or Docker. Both the Target and Attesting Environments are sub-components to a root Attester (aka Principal with the Attester Role). Such sub-components may be described with the graph/hierarchical decomposition of the Attester, provided above. In this context. FIG. 14 is provided as an example of Rule 4 in Table 4; namely: (K joins A) says (C union t): Attestation of t given C, (where A is the Attesting Env and C is the Target Env). Accordingly, the "COLLECT CLAIMS" operation in FIG. 14 maps to "A says (C union t)". Moreover, in FIG. 14, the operation providing "EVIDENCE" from Attesting Env to Verifier maps to "(K joins A) says . . . which means the key K signs the evidence (C union t).

Function Definition Language Details

A function definition language (FDL) usable in an NFN or edge computing attestation setting may be constructed from existing data modeling languages (DML), for example. This approach leverages existing developer tools and technology. In some examples, DMLs describe RESTful function call semantics using a data modeling language. For example, given an available endpoint (/users) and operations on each endpoint (GET /users, POST /users), the DML key words "GET" and "POST" describe simple REST request response behaviors. The examples disclosed herein extend the REST semantics for NFN to include named function execution, rather than implying function execution by modeling only data exchange.

Below is an example FDL pipeline that integrates attestation. An FDL script may be used to support execution of NFN functions. For example, a function interface definition may look like the following:

TABLE 11

```
GET Attestation Evidence as <aev1> for <data1> from <location1> //e.g., NDN source
GET Attestation Evidence as <aev2> for <data2> from <location2>
GET Attestation Evidence as <aev3> for <Preprocess( )> from <location3> //e.g. NFN source
GET Attestation Evidence as <aev4> for <Monte-Carlo( )> from <location4> //e.g. NFN source
RUN Preprocess(aev1, aev3, data1) at <location5> |
    Preprocess(aev2, aev3, data2) at <location5> |
    Monte-Carlo(aev4) at <location5>; //where the cleaned and attested data1 and data2
are inputs to Monte-Carlo.
```

This FDL expression provides another example of NFN orchestration that is extended to intertwine function execution. As will be understood, this FDL expression may also be provided using CDDL expressions, as discussed above.

Note that in the FDL expression of Table 11, the "RUN" keyword orchestrates the three function invocations and "|" connects function outputs to function inputs. The functions Preprocess( ) and Monte-Carlo( ) implement attestation verifiers. Attestation results are evaluated prior to performing data sanitation and Monte-Carlo analysis. Also note that the location where the function (the function in an NFN) resides may differ from the location where it is executed. Therefore, the attestation evidence is given to the function at its intended execution location. This abstraction allows for greater efficiency and optimization of the placement of certain operations and resources, which is beneficial for not only attestation, but energy efficiency, orchestration performance, and the like.

Also note that the specification of '<location>' differs from conventional NDN/NFN behavior, but the FDL introduces the logical abstraction to comprehend attestation semantics, namely the need to associate a resource (file, function) with a trustworthy environment. Additionally, the use of a '<location>' provides a name that becomes associated with the NDN/NFN node where the data or function is ultimately found. It may be used to associate the attestation properties of the physical device that holds the data or function named by the above interface definition FDL.

Additional Considerations for Definitions

The attestation verifier responds to FDL instructions supplied by an NFN routing node or other trusted node(s) to augment FDL with attestation pre-requisite flows/checks. Use of FDL to describe Edge workloads enables dynamic augmentation of user supplied (and potentially insecure FDL expressions) with security validated FDL expressions. For example, a user FDL may invoke an FaaS Function F1 that is interpreted (but not executed) by an NFN Node to determine if F1 has been attested. If not, it may augment a user-supplied, potentially insecure FDL expression, such as FDL1, with instructions to perform attestation to produce a changed FDL expression, namely FDL1'. Instead of FDL1, it is FDL1' that is executed, which achieves FDL1 execution securely.

The examples disclosed herein describe how a Concise Data Definition Language may be modified to become a Function Definition Language. Thus, the examples disclosed herein deliver flexibility to apply these security and compositing dynamics efficiently and securely by capitalizing on the use of the FDL.

The NFN node retrieves the data and function from the corresponding providers and retrieves the attestation results. If the function is described as a DML, the DML is parsed and the function is generated on the fly (aka compositing). Then, a virtuous cycle for further compositing operations is enabled by registering the new functions with the attestation server.

Known trust calculi can be extended to become a calculus for evaluating trust in addition to access. There is potential opportunity in automation use cases.

Resources that exceed a threshold may have access control consequences. Otherwise, there may be a different enforcement consequence. (Allow, deny, sandbox-allow, . . . etc.)

NFN Function Generator

The NFN function generator (such as generator 1220 depicted in FIG. 12) relies on a function calculus to generate functions dynamically. Generation of attestation logic is integrated into existing functions or may be part of generalized function generation solution that accepts as input a function definition and produces an NFN function as output. The trust calculus discussed herein (e.g., with reference to FIGS. 8 to 10) may be extended to support NDN/NFN attestation function generation. Accordingly, in various settings, a representation of an attestation expression using a data definition language can be fed into a trust verification engine, such as the NFN attestation verifier in FIG. 12 (or, the verification engine depicted in FIG. 8).

As suggested above, a trust calculus may be modified to allow meta-language expressions that natively describe attestation function semantics, for use in NDN networks or otherwise. The operator definitions discussed in Table 9 above map to functions and may be used in a CDDL to allow type enforced function expressions. As also suggested above, because there is a machine-readable data definition (CDDL) of the calculus and because the calculus can describe attestation and trust semantics, the various ecosystem stakeholders in an ICN/NDN are able to dynamically generate function with attestation semantics and can evaluate trust (not just attributes or tag-values).

The following provides an example of a CDDL definition of an Edge orchestration description that dynamically generates functions. In this example functions can be generated for edge attestation (edge-attest) and edge orchestration (edge-orchestration), in addition to use of other NFN functions:

claims (e.g. says, controls), and appropriate for roles (e.g. for) so that function generation does not create malformed expressions.

Note that calculus principals resolve to 'text' expressions in the above encoding by the grammar, but it is expected that the principal is a legitimate identity in the ICN network. The principals may also be composed of multiple values that establish identity such as a postal address, product name consisting of a vendor, model, version or an X.509 Common Name, for example.

Also note that CDDL tools may generate machine-readable (e.g. CBOR) serialized expressions of the grammar that are suitable for applying cryptographic operations such as hashing, signing and encryption. Thus. NFN functions can be protected using the same tools used to protect data in an ICN.

TABLE 12

```
edge-calculus = edge-attestation / edge-orchestration
    edge-orchestration = [edge-funcA esuffix, edge-attest esuffix, edge-funcB esuffix,...]
    edge-funcA = ...some NFN function A...
    edge-funcB = ...some NFN function B...
    edge-attest = [principal action-suffix]
    principal = {
        principal-name /
        composite-principal : CompositePrincipal /
        "(" principal ")"
    }
    CompositePrincipal = {
        principal-name /
        CompositePrincipal "."
    }
    principal-name = text
    action-suffix = saction-suffix / paction-suffix / raction-suffix / eaction-suffix
    saction-suffix = ssuffix / "(" action-suffix ")"
    paction-suffix = psuffix / "(" action-suffix ")"
    raction-suffix = rsuffix / "(" action-suffix ")"
    eaction-suffix = esuffix / "(" action-suffix ")"
    ssuffix = [saction : ActionsOnStatement statement-or-claim]
    psuffix = [paction : ActionsOnPrincipals principal]
    rsuffix = [raction : ActionsOnRole role]
    esuffix = [eaction : ActionsOnFunction function]
    ActionsOnPrincipal = &(
        ?joins : 3 /
        ?equals : 4 /
        ?serves : 5 /
        ?union : 6 /
        ?quotes : 7 /
        ?as : 9 /
        ?intersect : 10 /
        ?minus : 11 /
        ?sub : 12
    )
    ActionsOnStatement = &(
        ?says : 1 /
        ?controls : 2
    )
    ActionsOnRole = &(
        ?for : 8
    )
    ActionsOnFunction = &(
        ?exec : 13
    )
    role = text       ;Constrained by an owner defined roles listing
    statement-or-claim = {statement / tstatement}
    statement = text; Constrained by not being a principal
    claim = text; Constrained by a standardized list of statements that have trust
semantics
    function = text; Constrained by NFN router designation as a function
```

The above example describes the parameters for correct dynamic generation of functions that the NFN function generator (e.g., generator 1230 in FIG. 12) performs. The NFN function generator assigns operations that are appropriate for principals (e.g. joins, equals, serves, union, quotes, as, intersect, minus and sub), appropriate for statements or Security and Data Privacy Considerations for NFN Functions Many benefits are provided from the preceding approaches for NFN function execution. These include transparency of function execution so that edge data flows can be aligned with different attestation, security, and privacy regulations across geographic and institutional boundaries, without complicating the operational logic of the user defined functions. For example, the European Union General Data Protection Regulation, other regulations on digital data privacy, and similar laws and mandates from other nations, institutions, etc. may be enforced within NFNs and attestation service engines in a distributed and adaptive manner, without encumbering function and data expressions that are orthogonal to such requirements. Similarly, logging and auditing mandates of different principals and principalities can be accommodated transparently.

Accordingly, the attestation and trust calculus components of the examples disclosed herein may also include third party commitments with respect to data privacy and security. Thus, for example, a commitment that a principal shall enforce digital rights management (DRM) (duly assured by a controlling clause) ensures protection from theft of content and service by non-compliant parties. Further, the attestation and delegation of security responsibilities described above apply to caching and storage of contents and to execution and storage of results at the NFN intermediaries in an edge FaaS network according to the examples disclosed herein. Note that execution of edge workloads, according to an edge SLA, may utilize distributed orchestration where the control over orchestration is distributed across the various NFN participants. Orchestration control may be scripted using a Function Definition Language (FDL) to choreograph a set of functions over a set of entities including NFN participants.

Integration with DICE Reference Integrity Manifest Structure

In some of the examples disclosed herein, the attestation verifier (e.g., discussed with reference to FIG. 14) may use a reference integrity manifest (RIM) structure to validate the attestation claims against attestation evidence. In an example, the NFN/NDN networks may include a distributed trusted computing base (TCB) architecture that utilizes device identifier composition engine (DICE) layering. This is provided in additional detail in FIGS. 15 and 16. In an example, each TCB component's evidence may be part of a certificate, which may be dynamically generated by a DICE layer n−1. Certificates may contain both evidence and endorsement extensions. If a verifier has network access, endorsement extensions can be a uniform resource identifier (URI) to the corresponding endorsement for a specific TCB. In some cases, certificate path validation may be overloaded with evidence appraisals and thus, the layer n−1 TCB may need to know which approach the verifier prefers for obtaining endorsements. This approach may be negotiated prior to DICE certificates being issued.

Figure 15:
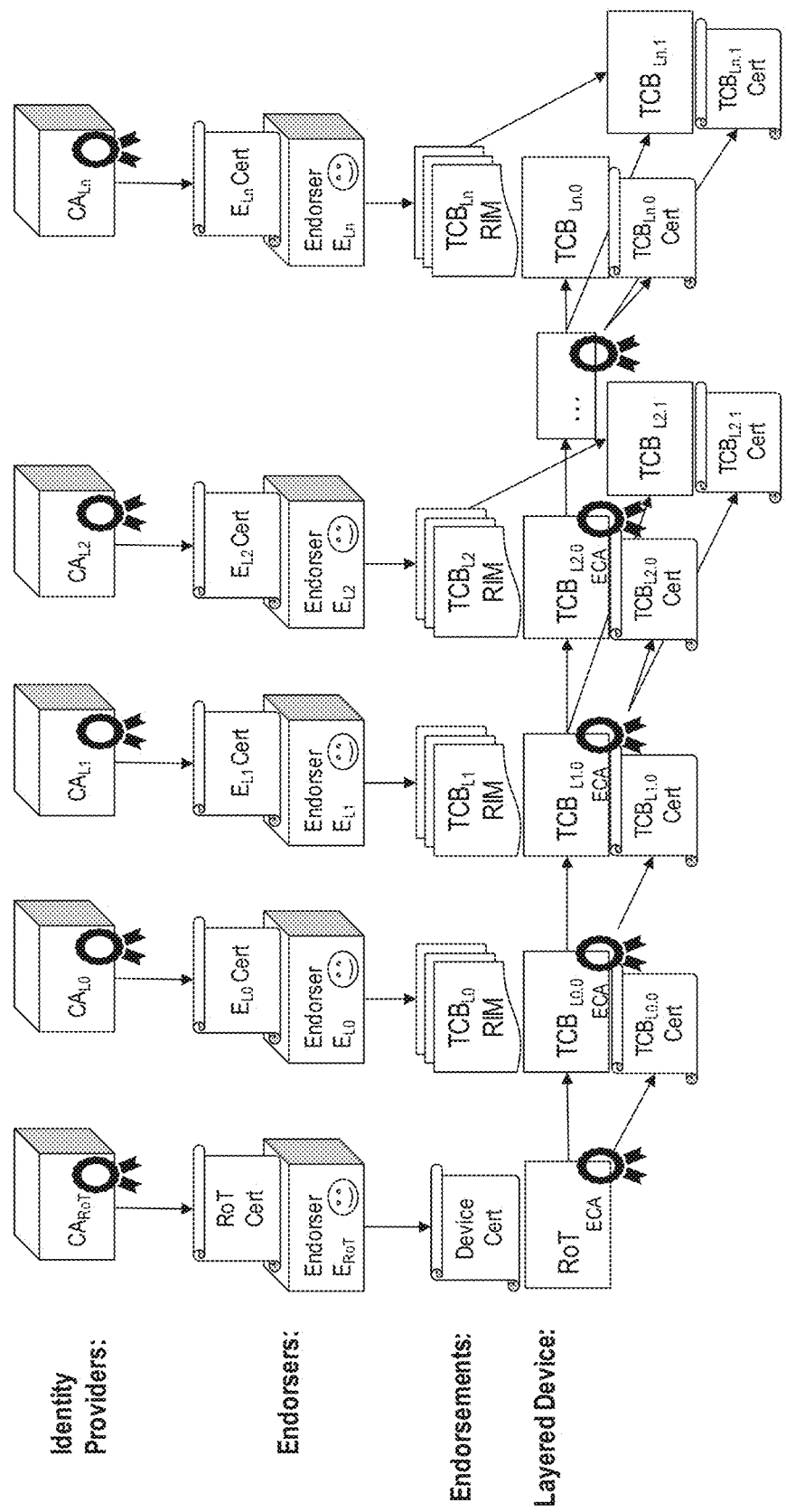
FIG. 15 is a diagram illustrating an example relationship between reference integrity manifests (RIMs) and device identifier composition engine (DICE) layering, according to an example.
Figure 16:
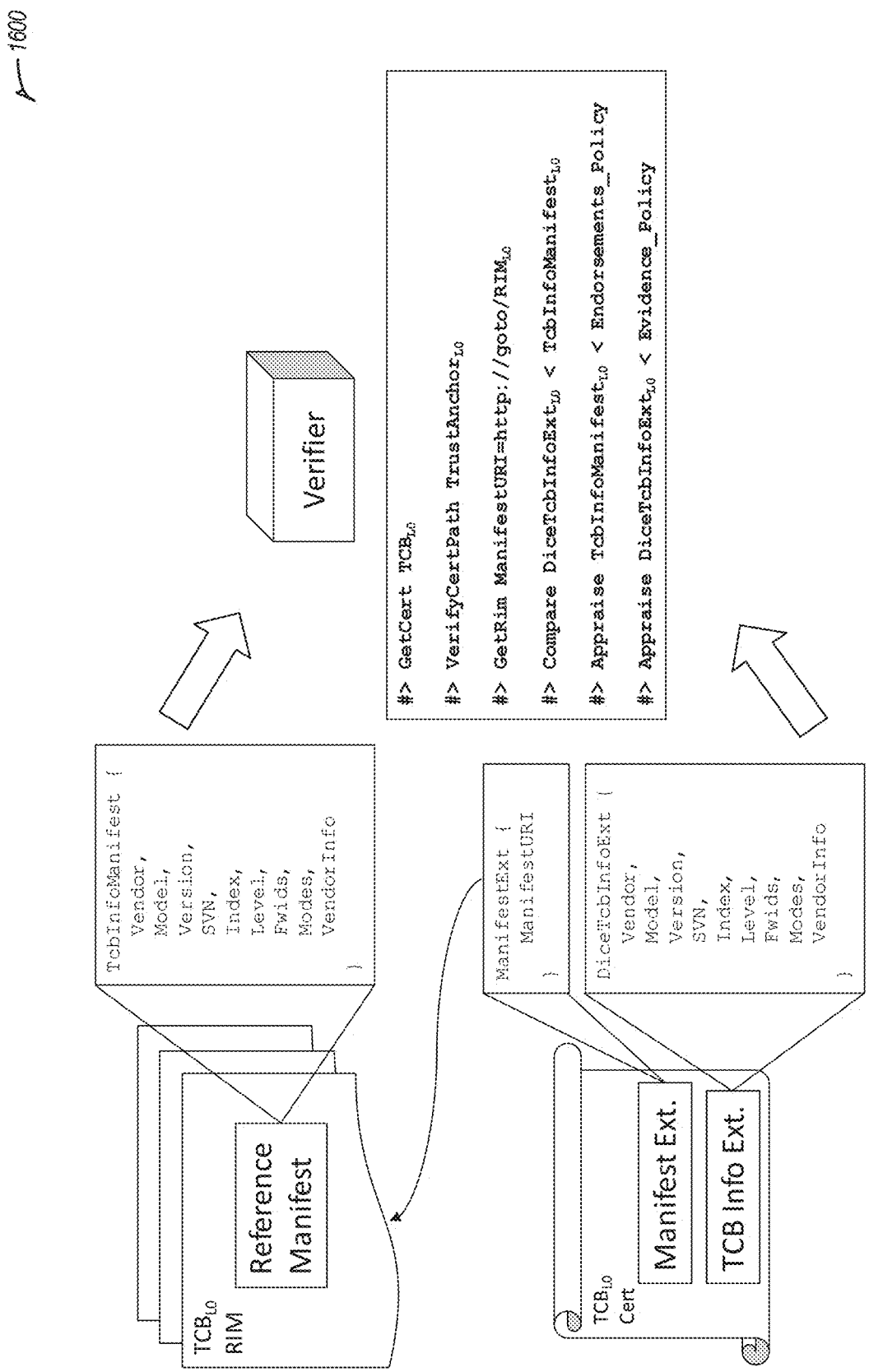
FIG. 16 is a diagram illustrating an example system for verifying evidence with endorsements, according to an example.

With reference to FIGS. 15 and 16, a different manifestURI may be specified for each $TCB_{Lx}$. The verifier may use this manifestURI to locate a nested resource within a RIM or a Support RIM containing a single resource record for $TCB_{Lx}$. The vendor may build both the RIM and the TCB to prevent the verifier from confusion. Concise software identification (CoSWID) supports nesting within a RIM, and Trusted Computing Group (TCG) Base RIM supports nesting of RIMs. For CoSWID, /filesystem/ may need to be overloaded and extended to describe a TCBInfo structure. For TCG Base RIM, the Base Rim and Support RIM may need to be zipped in order to pass as a PDU payload. In some examples, if each $TCB_{Lx}$ has a different Endorser, then there may be a different signed RIM for each $TCB_{Lx}$.

ADDITIONAL NOTES AND EXAMPLES

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is an edge computing verification node, comprising: a plurality of hardware components, including processing circuitry; and a memory device including instructions embodied thereon, wherein the instructions, which when executed by the processing circuitry, configure the hardware components to perform operations to: obtain a trust representation of an edge computing feature, the trust representation defined according to a trust calculus and provided in a data definition language, wherein the trust representation indicates properties of attestation for results from the edge computing feature; receive, from an edge computing node, compute results from use of the edge computing feature; receive, from the edge computing node, attestation evidence associated with the use of the edge computing feature; attempt validation of the attestation evidence based on the properties of attestation defined by the obtained trust representation; and communicate an indication of trustworthiness for the compute results, based on the validation of the attestation evidence.

In Example 2, the subject matter of Example 1 optionally includes wherein the edge computing feature comprises a computing function, service, or application of the edge computing node, the edge computing feature to be invoked by a user.

In Example 3, the subject matter of Example 2 optionally includes wherein the compute results from the edge computing feature comprise data produced by the computing function, service, or application of the edge computing node.

In Example 4, the subject matter of any one or more of Examples 1-3 optionally include wherein the validation of the attestation evidence is based on verification of evidence provided according to a Device Identifier Composition Engine (DICE) security architecture.

In Example 5, the subject matter of any one or more of Examples 1-4 optionally include wherein the verification node is implemented in an orchestrator of an edge computing system, to establish trusted operations of the edge computing feature to be performed among one or more of a plurality of edge computing nodes, and wherein the orchestrator further evaluates one or more identified properties of reliability and quality of service for the use of the edge computing feature.

In Example 6, the subject matter of Example 5 optionally includes wherein the use of the edge computing feature is provided from at least one of the plurality of edge computing nodes, wherein the orchestrator operates to identify the edge computing node from among the plurality to provide the compute results.

In Example 7, the subject matter of any one or more of Examples 1-6 optionally include wherein the data definition language includes use of syntax provided from: JavaScript Object Notation (JSON), JSON Web Token (JWT), CBOR Web Token (CWT), or Concise data definition language (CDDL).

In Example 8, the subject matter of any one or more of Examples 1-7 optionally include wherein the trust calculus is used to define trustworthiness of a compute function accessible in a named function network (NFN), the NFN configured to provide at least one named function from among a plurality of edge computing nodes.

In Example 9, the subject matter of Example 8 optionally includes wherein a user of the NFN is enabled to access the at least one named function based on a description of the function and a trustworthiness property indicated in the trust representation.

In Example 10, the subject matter of Example 9 optionally includes wherein the compute function is provided by the edge computing node with Dynamic Function Composition (DFC), by dynamically composing a new compute function from a plurality of existing compute functions.

In Example 11, the subject matter of any one or more of Examples 9-10 optionally include wherein the compute function is attestable based on a syntax and semantics of the compute function defined with a function description language in the trust representation.

In Example 12, the subject matter of any one or more of Examples 9-11 optionally include wherein the operations are performed by a routing or caching node of the NFN, wherein the operations further comprise providing the results of the compute results to the user.

Example 13 is a method for implementing edge computing verification in an edge computing environment, using operations performed by an edge computing verification node, the operations comprising: obtaining a trust representation of an edge computing feature, the trust representation defined according to a trust calculus and provided in a data definition language, wherein the trust representation indicates properties of attestation for results from the edge computing feature; receiving, from an edge computing node, compute results from use of the edge computing feature; receiving, from the edge computing node, attestation evidence associated with the use of the edge computing feature; attempting validation of the attestation evidence based on the properties of attestation defined by the obtained trust representation; and communicating an indication of trustworthiness for the compute results, based on the validation of the attestation evidence.

In Example 14, the subject matter of Example 13 optionally includes wherein the edge computing feature comprises a computing function, service, or application of the edge computing node, the edge computing feature to be invoked by a user.

In Example 15, the subject matter of Example 14 optionally includes wherein the compute results from the edge computing feature comprise data produced by the computing function, service, or application of the edge computing node.

In Example 16, the subject matter of any one or more of Examples 13-15 optionally include wherein the validation of the attestation evidence is based on verification of evidence provided according to a Device Identifier Composition Engine (DICE) security architecture.

In Example 17, the subject matter of any one or more of Examples 13-16 optionally include wherein the verification node is implemented in an orchestrator of an edge computing system, to establish trusted operations of the edge computing feature to be performed among one or more of a plurality of edge computing nodes, and wherein the orchestrator further evaluates one or more identified properties of reliability and quality of service for the use of the edge computing feature.

In Example 18, the subject matter of Example 17 optionally includes wherein the use of the edge computing feature is provided from at least one of the plurality of edge computing nodes, wherein the orchestrator operates to identify the edge computing node from among the plurality to provide the compute results.

In Example 19, the subject matter of any one or more of Examples 13-18 optionally include wherein the data definition language includes use of syntax provided from: JavaScript Object Notation (JSON), JSON Web Token (JWT), CBOR Web Token (CWT), or Concise data definition language (CDDL).

In Example 20, the subject matter of any one or more of Examples 13-19 optionally include wherein the trust calculus is used to define trustworthiness of a compute function accessible in a named function network (NFN), the NFN configured to provide at least one named function from among a plurality of edge computing nodes.

In Example 21, the subject matter of Example 20 optionally includes wherein a user of the NFN is enabled to access the at least one named function based on a description of the function and a trustworthiness property indicated in the trust representation.

In Example 22, the subject matter of Example 21 optionally includes wherein the compute function is provided by the edge computing node with Dynamic Function Composition (DFC), by dynamically composing a new compute function from a plurality of existing compute functions.

In Example 23, the subject matter of any one or more of Examples 21-22 optionally include wherein the compute function is attestable based on a syntax and semantics of the compute function defined with a function description language in the trust representation.

In Example 24, the subject matter of any one or more of Examples 21-23 optionally include wherein the operations are performed by a routing or caching node of the NFN, wherein the operations further comprise providing the results of the compute results to the user.

Example 25 is at least one non-transitory machine-readable storage device comprising instructions stored thereupon, which when executed by processing circuitry of an edge computing verification node, cause the processing circuitry to perform operations comprising: obtaining a trust representation of an edge computing feature, the trust representation defined according to a trust calculus and provided in a data definition language, wherein the trust representation indicates properties of attestation for results from the edge computing feature; receiving, from an edge computing node, compute results from use of the edge computing feature; receiving, from the edge computing node, attestation evidence associated with the use of the edge computing feature; attempting validation of the attestation evidence based on the properties of attestation defined by the obtained trust representation; and communicating an indication of trustworthiness for the compute results, based on the validation of the attestation evidence.

In Example 26, the subject matter of Example 25 optionally includes wherein the edge computing feature comprises a computing function, service, or application of the edge computing node, the edge computing feature to be invoked by a user.

In Example 27, the subject matter of Example 26 optionally includes wherein the compute results from the edge computing feature comprise data produced by the computing function, service, or application of the edge computing node.

In Example 28, the subject matter of any one or more of Examples 25-27 optionally include wherein the validation of the attestation evidence is based on verification of evidence provided according to a Device Identifier Composition Engine (DICE) security architecture.

In Example 29, the subject matter of any one or more of Examples 25-28 optionally include wherein the verification node is implemented in an orchestrator of an edge computing system, to establish trusted operations of the edge computing feature to be performed among one or more of a plurality of edge computing nodes, and wherein the orchestrator further evaluates one or more identified properties of reliability and quality of service for the use of the edge computing feature.

In Example 30, the subject matter of Example 29 optionally includes wherein the use of the edge computing feature is provided from at least one of the plurality of edge computing nodes, wherein the orchestrator operates to identify the edge computing node from among the plurality to provide the compute results.

In Example 31, the subject matter of any one or more of Examples 25-30 optionally include wherein the data definition language includes use of syntax provided from: JavaScript Object Notation (JSON), JSON Web Token (JWT), CBOR Web Token (CWT), or Concise data definition language (CDDL).

In Example 32, the subject matter of any one or more of Examples 25-31 optionally include wherein the trust calculus is used to define trustworthiness of a compute function accessible in a named function network (NFN), the NFN configured to provide at least one named function from among a plurality of edge computing nodes.

In Example 33, the subject matter of Example 32 optionally includes wherein a user of the NFN is enabled to access the at least one named function based on a description of the function and a trustworthiness property indicated in the trust representation.

In Example 34, the subject matter of Example 33 optionally includes wherein the compute function is provided by the edge computing node with Dynamic Function Composition (DFC), by dynamically composing a new compute function from a plurality of existing compute functions.

In Example 35, the subject matter of any one or more of Examples 33-34 optionally include wherein the compute function is attestable based on a syntax and semantics of the compute function defined with a function description language in the trust representation.

In Example 36, the subject matter of any one or more of Examples 33-35 optionally include wherein the operations are performed by a routing or caching node of the NFN, wherein the operations further comprise providing the results of the compute results to the user.

Example 37 is an apparatus for edge computing verification in an edge computing environment, comprising: means for accessing a trust representation of an edge computing feature, the trust representation defined according to a trust calculus and provided in a data definition language, wherein the trust representation indicates properties of attestation for results from the edge computing feature; means for receiving, from an edge computing node, compute results from use of the edge computing feature and attestation evidence associated with the use of the edge computing feature; means for attempting validation of the attestation evidence based on the properties of attestation defined by the trust representation; and means for transmitting an indication of trustworthiness for the compute results, based on the validation of the attestation evidence.

In Example 38, the subject matter of Example 37 optionally includes wherein the edge computing feature is implemented within a means for providing a computing function, service, or application of the edge computing node, the edge computing feature to be invoked by a user.

In Example 39, the subject matter of Example 38 optionally includes wherein the compute results from the edge computing feature comprise data produced by the computing function, service, or application of the edge computing node.

In Example 40, the subject matter of any one or more of Examples 37-39 optionally include wherein the validation of the attestation evidence is based on verification of evidence provided according to a security architecture means.

In Example 41, the subject matter of any one or more of Examples 37-40 optionally include wherein the apparatus is implemented in an orchestration means of an edge computing system, to establish trusted operations of the edge computing feature to be performed among one or more of a plurality of edge computing nodes, and wherein the orchestration means further evaluates one or more identified properties of reliability and quality of service for the use of the edge computing feature.

In Example 42, the subject matter of Example 41 optionally includes wherein the use of the edge computing feature is provided from at least one of the plurality of edge computing nodes, wherein the orchestration means operates to identify the edge computing node from among the plurality to provide the compute results.

In Example 43, the subject matter of any one or more of Examples 37-42 optionally include wherein the data definition language includes use of syntax provided from: JavaScript Object Notation (JSON), JSON Web Token (JWT), CBOR Web Token (CWT), or Concise data definition language (CDDL).

In Example 44, the subject matter of any one or more of Examples 37-43 optionally include wherein the trust calculus is used to define trustworthiness of a compute function accessible in a named function network (NFN), the NFN configured to provide at least one named function from among a plurality of edge computing nodes.

In Example 45, the subject matter of Example 44 optionally includes wherein a user of the NFN is enabled to access the at least one named function based on a description of the function and a trustworthiness property indicated in the trust representation.

In Example 46, the subject matter of Example 45 optionally includes wherein the compute function is provided by the edge computing node with Dynamic Function Composition (DFC), by dynamically composing a new compute function from a plurality of existing compute functions.

In Example 47, the subject matter of any one or more of Examples 45-46 optionally include wherein the compute function is attestable based on a syntax and semantics of the compute function defined with a function description language in the trust representation.

In Example 48, the subject matter of any one or more of Examples 45-47 optionally include wherein the operations are performed by a routing or caching node of the NFN, wherein the operations further comprise providing the results of the compute results to the user.

Another example implementation is a multi-tier edge computing system, comprising a plurality of edge computing nodes provided among on-premise edge, network access edge, or near edge computing settings, the plurality of edge computing nodes configured to perform any of the attestation or trust verification methods of Examples 1 to 48, or other subject matter described herein.

Another example implementation is an edge computing system, comprising a plurality of edge computing nodes, the plurality of edge computing nodes configured to perform any of the attestation or trust verification methods of Examples 1 to 48, or other subject matter described herein.

Another example implementation is an edge computing node, operable in an edge computing system, comprising processing circuitry configured to implement any of the attestation or trust verification methods of Examples 1 to 48, or other subject matter described herein.

Another example implementation is an edge computing node, operable as a server in an edge computing system, configured to perform any of the attestation or trust verification methods of Examples 1 to 48, or other subject matter described herein.

Another example implementation is an edge computing node, operable as a client in an edge computing system, configured to perform any of the attestation or trust verification methods of Examples 1 to 48, or other subject matter described herein.

Another example implementation is an edge computing node, operable in a layer of an edge computing network as an aggregation node, network hub node, gateway node, or core data processing node, configured to perform any of the attestation or trust verification methods of Examples 1 to 48, or other subject matter described herein.

Another example implementation is an edge computing network, comprising networking and processing components configured to provide or operate a communications network, to enable an edge computing system to implement any of the attestation or trust verification methods of Examples 1 to 48, or other subject matter described herein.

Another example implementation is a road-side unit, comprising networking components configured to provide or operate a communications network, to enable an edge computing system to implement any of the attestation or trust verification methods of Examples 1 to 48, or other subject matter described herein.

Another example implementation is an on-premise server, operable in a private communications network distinct from a public edge computing network, the server configured to enable an edge computing system to implement any of the attestation or trust verification methods of Examples 1 to 48, or other subject matter described herein.

Another example implementation is an edge provisioning node, operable in an edge computing system, configured to implement any of the attestation or trust verification methods of Examples 1 to 48, or other subject matter described herein.

Another example implementation is a service orchestration node, operable in an edge computing system, configured to implement any of the attestation or trust verification methods of Examples 1 to 48, or other subject matter described herein.

Another example implementation is an application orchestration node, operable in an edge computing system, configured to implement any of the attestation or trust verification methods of Examples 1 to 48, or other subject matter described herein.

Another example implementation is a multi-tenant management node, operable in an edge computing system, configured to implement any of the attestation or trust verification methods of Examples 1 to 48, or other subject matter described herein.

Another example implementation is an edge computing system comprising processing circuitry, the edge computing system configured to operate one or more functions and services to implement any of the attestation or trust verification methods of Examples 1 to 48, or other subject matter described herein.

Another example implementation is networking hardware with network functions implemented thereupon, operable within an edge computing system, the network functions configured to implement any of the attestation or trust verification methods of Examples 1 to 48, or other subject matter described herein.

Another example implementation is acceleration hardware with acceleration functions implemented thereupon, operable in an edge computing system, the acceleration functions configured to implement any of the attestation or trust verification methods of Examples 1 to 48, or other subject matter described herein.

Another example implementation is storage hardware with storage capabilities implemented thereupon, operable in an edge computing system, the storage hardware configured to implement any of the attestation or trust verification methods of Examples 1 to 48, or other subject matter described herein.

Another example implementation is computation hardware with compute capabilities implemented thereupon, operable in an edge computing system, the computation hardware configured to implement any of the attestation or trust verification methods of Examples 1 to 48, or other subject matter described herein.

Another example implementation is an edge computing system adapted for supporting vehicle-to-vehicle (V2V), vehicle-to-everything (V2X), or vehicle-to-infrastructure (V2I) scenarios, configured to implement any of the methods of Examples 1 to 48, or other subject matter described herein.

Another example implementation is an edge computing system adapted for operating according to one or more European Telecommunications Standards Institute (ETSI) Multi-Access Edge Computing (MEC) specifications, the edge computing system configured to implement any of the attestation or trust verification methods of Examples 1 to 48, or other subject matter described herein.

Another example implementation is an edge computing system adapted for operating one or more multi-access edge computing (MEC) components, the MEC components provided from one or more of: a MEC proxy, a MEC application orchestrator, a MEC application, a MEC platform, or a MEC service, according to an European Telecommunications Standards Institute (ETST) Multi-Access Edge Computing (MEC) configuration, the MEC components configured to implement any of the attestation or trust verification methods of Examples 1 to 48, or other subject matter described herein.

Another example implementation is an edge computing system configured as an edge mesh, provided with a microservice cluster, a microservice cluster with sidecars, or linked microservice clusters with sidecars, configured to implement any of the attestation or trust verification methods of Examples 1 to 48, or other subject matter described herein.

Another example implementation is an edge computing system configured to implement any of the methods of Examples 1 to 48, or other subject matter described herein with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Another example implementation is an edge computing system, comprising computing nodes operated by multiple owners at different geographic locations, configured to implement any of the attestation or trust verification methods of Examples 1 to 48, or other subject matter described herein.

Another example implementation is a server, comprising hardware to operate cloudlet, edgelet, or applet services, the services configured to coordinate with an edge computing system to implement any of the attestation or trust verification methods of Examples 1 to 48, or other subject matter described herein.

Another example implementation is an edge node in an edge computing system, comprising one or more devices with at least one processor and memory to implement any of the methods of Examples 1 to 48, or other subject matter described herein.

Another example implementation is an edge node in an edge computing system, the edge node operating one or more services provided from among: a management console service, a telemetry service, a provisioning service, an application or service orchestration service, a virtual machine service, a container service, a function deployment service, or a compute deployment service, or an acceleration management service, the one or more services configured to implement any of the attestation or trust verification methods of Examples 1 to 48, or other subject matter described herein.

Another example implementation is a set of distributed edge nodes, distributed among a network layer of an edge computing system, the network layer comprising a close edge, local edge, enterprise edge, on-premise edge, near edge, middle, edge, or far edge network layer, configured to implement any of the attestation or trust verification methods of Examples 1 to 48, or other subject matter described herein.

Another example implementation is an apparatus of an edge computing system comprising: one or more processors and one or more computer-readable media comprising instructions that, when executed by the one or more processors, cause the one or more processors to perform any of the attestation or trust verification methods of Examples 1 to 48, or other subject matter described herein.

Another example implementation is one or more computer-readable storage media comprising instructions to cause an electronic device of an edge computing system, upon execution of the instructions by one or more processors of the electronic device, to perform any of the attestation or trust verification methods of Examples 1 to 48, or other subject matter described herein.

Another example implementation is a communication signal communicated in an edge computing system, to perform any of the attestation or trust verification methods of Examples 1 to 48, or other subject matter described herein.

Another example implementation is a computer program used in an edge computing system, the computer program comprising instructions, wherein execution of the program by a processing element in the edge computing system is to cause the processing element to perform any of the attestation or trust verification methods of Examples 1 to 48, or other subject matter described herein.

Another example implementation is an apparatus of an edge computing system comprising means to perform any of the attestation or trust verification methods of Examples 1 to 48, or other subject matter described herein.

Another example implementation is an apparatus of an edge computing system comprising logic, modules, or circuitry to perform any of the attestation or trust verification methods of Examples 1 to 48, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An edge computing verification node, comprising:
a plurality of hardware components, including processing circuitry; and
a memory device including instructions embodied thereon, wherein the instructions, which when executed by the processing circuitry, configure the hardware components to perform operations to:
obtain a trust representation of an edge computing feature, the edge computing feature provided by an edge computing node, the trust representation defined according to a trust calculus, and the trust representation provided in a data model of a manifest expressed according to a data definition language, wherein the trust representation defines properties of attestation for the edge computing verification node to validate before establishing trust in compute results produced from a use of the edge computing feature;
receive, from the edge computing node, the compute results produced from the use of the edge computing feature;
receive, from the edge computing node, attestation evidence associated with the use of the edge computing feature;
attempt validation of the attestation evidence based on the properties of attestation defined by the data model of the manifest; and
communicate an indication of trustworthiness for the compute results, based on the validation of the attestation evidence.

2. The computing node of claim 1, wherein the edge computing feature comprises a computing function, service, or application of the edge computing node, the edge computing feature to be invoked by a user.

3. The computing node of claim 2, wherein the compute results produced from the use of the edge computing feature comprise data produced by the computing function, service, or application of the edge computing node.

4. The computing node of claim 1, wherein the validation of the attestation evidence is based on verification of evidence provided according to a Device Identifier Composition Engine (DICE) security architecture.

5. The computing node of claim 1, wherein the verification node is implemented in an orchestrator of an edge computing system, to establish trusted operations of the edge computing feature to be performed among one or more of a plurality of edge computing nodes, and wherein the orchestrator further evaluates one or more identified properties of reliability and quality of service for the use of the edge computing feature.

6. The computing node of claim 5, wherein the use of the edge computing feature is provided from at least one of the plurality of edge computing nodes, wherein the orchestrator operates to identify the edge computing node from among the plurality to provide the compute results.

7. The computing node of claim 1, wherein the data definition language includes use of syntax provided from: JavaScript Object Notation (JSON), JSON Web Token (JWT), CBOR Web Token (CWT), or Concise data definition language (CDDL).

8. The computing node of claim 1, wherein the edge computing feature is an edge computing function, wherein the trust calculus is used to define trustworthiness of the edge computing function accessible in a named function network (NFN), the NFN configured to provide at least one named function from among a plurality of edge computing nodes, and wherein a user of the NFN is enabled to access the at least one named function based on a description of the named function and a trustworthiness property indicated in the trust representation.

9. The computing node of claim 8, wherein the edge computing function is provided by the edge computing node with Dynamic Function Composition (DFC), by dynamically composing a new compute function from a plurality of existing compute functions.

10. The computing node of claim 8, wherein the edge computing function is attestable based on a syntax and semantics of the edge computing function defined with a function description language in the trust representation.

11. The computing node of claim 8, wherein the operations are performed by a routing or caching node of the NFN, wherein the operations further comprise providing the results of the compute results to the user.

12. The computing node of claim 1, wherein the edge computing feature is an edge computing function, and wherein the edge computing function is provided from dynamic composing of a new compute function from a plurality of existing compute functions.

13. At least one non-transitory machine-readable storage device comprising instructions stored thereupon, which when executed by processing circuitry of an edge computing verification node, cause the processing circuitry to perform operations comprising:
obtaining a trust representation of an edge computing feature, the edge computing feature provided by an edge computing node, the trust representation defined according to a trust calculus, and the trust representation provided in a data model of a manifest expressed according to a data definition language, wherein the trust representation defines properties of attestation for the edge computing verification node to validate before establishing trust in compute results produced from a use of the edge computing feature;
receiving, from the edge computing node, the compute results produced from the use of the edge computing feature;
receiving, from the edge computing node, attestation evidence associated with the use of the edge computing feature;
attempting validation of the attestation evidence based on the properties of attestation defined by the data model of the manifest; and
communicating an indication of trustworthiness for the compute results, based on the validation of the attestation evidence.

14. The machine-readable storage device of claim 13, wherein the edge computing feature comprises a computing function, service, or application of the edge computing node, the edge computing feature to be invoked by a user, and wherein the compute results produced from the use of the edge computing feature comprise data produced by the computing function, service, or application of the edge computing node.

15. The machine-readable storage device of claim 13, wherein the validation of the attestation evidence is based on verification of evidence provided according to a Device Identifier Composition Engine (DICE) security architecture.

16. The machine-readable storage device of claim 13, wherein the verification node is implemented in an orchestrator of an edge computing system, to establish trusted operations of the edge computing feature to be performed among one or more of a plurality of edge computing nodes, and wherein the orchestrator further evaluates one or more identified properties of reliability and quality of service for the use of the edge computing feature.

17. The machine-readable storage device of claim 16, wherein the use of the edge computing feature is provided from at least one of the plurality of edge computing nodes, wherein the orchestrator operates to identify the edge computing node from among the plurality to provide the compute results.

18. The machine-readable storage device of claim 13, wherein the data definition language includes use of syntax provided from: JavaScript Object Notation (JSON), JSON Web Token (JWT), CBOR Web Token (CWT), or Concise data definition language (CDDL).

19. The machine-readable storage device of claim 13, wherein the edge computing feature is an edge computing function, wherein the trust calculus is used to define trustworthiness of the edge computing function accessible in a named function network (NFN), the NFN configured to provide at least one named function from among a plurality of edge computing nodes, and wherein a user of the NFN is enabled to access the at least one named function based on a description of the named function and a trustworthiness property indicated in the trust representation.

20. The machine-readable storage device of claim 19, wherein the edge computing function is provided by the edge computing node with Dynamic Function Composition (DFC), by dynamically composing a new compute function from a plurality of existing compute functions.

21. The machine-readable storage device of claim 19, wherein the edge computing function is attestable based on a syntax and semantics of the edge computing function defined with a function description language in the trust representation.

22. The machine-readable storage device of claim 19, wherein the operations are performed by a routing or caching node of the NFN, wherein the operations further comprise providing the results of the compute results to the user.

23. The machine-readable storage device of claim 13, wherein the edge computing feature is an edge computing function, and wherein the edge computing function is provided from dynamic composing of a new compute function from a plurality of existing compute functions.

24. An apparatus for edge computing verification in an edge computing environment, comprising:
  memory means for storing a trust representation of an edge computing feature, the edge computing feature provided by an edge computing node, the trust representation defined according to a trust calculus, and the trust representation provided in a data model of a manifest expressed according to a data definition language, wherein the trust representation indicates defines properties of attestation the edge computing verification node to validate before establishing trust in compute for results from a use of the edge computing feature;
  network interface means for receiving, from the edge computing node, the compute results produced from the use of the edge computing feature and attestation evidence associated with the use of the edge computing feature; and
  processing means for attempting validation of the attestation evidence based on the properties of attestation defined by the data model of the manifest;
  wherein the network interface means is further adapted for transmitting an indication of trustworthiness for the compute results, based on the validation of the attestation evidence.

25. The apparatus of claim 24, wherein the edge computing feature is implemented within the processing means for providing a computing function, service, or application of the edge computing node, the edge computing feature to be invoked by a user, wherein the compute results produced from the use of the edge computing feature comprise data produced by the computing function, service, or application of the edge computing node, and wherein the validation of the attestation evidence is based on verification of evidence provided according to a security architecture means.

* * * * *

UNITED STATES PATENT AND TRADEMARK OFFICE
CERTIFICATE OF CORRECTION

PATENT NO. : 11,888,858 B2  
APPLICATION NO. : 17/064218  
DATED : January 30, 2024  
INVENTOR(S) : Smith et al.

Page 1 of 1

It is certified that error appears in the above-identified patent and that said Letters Patent is hereby corrected as shown below:

In the Claims

In Column 56, Line 18, in Claim 24, after "representation", delete "indicates"

Signed and Sealed this  
Eleventh Day of March, 2025

Coke Morgan Stewart  
*Acting Director of the United States Patent and Trademark Office*